(12) United States Patent
Yamane

(10) Patent No.: US 8,616,825 B2
(45) Date of Patent: Dec. 31, 2013

(54) TURNOVER APPARATUS

(75) Inventor: Shigemi Yamane, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 95 days.

(21) Appl. No.: 13/203,032

(22) PCT Filed: Feb. 17, 2010

(86) PCT No.: PCT/JP2010/052382
§ 371 (c)(1),
(2), (4) Date: Aug. 24, 2011

(87) PCT Pub. No.: WO2010/098241
PCT Pub. Date: Sep. 2, 2010

(65) Prior Publication Data
US 2011/0311344 A1 Dec. 22, 2011

(30) Foreign Application Priority Data
Feb. 27, 2009 (JP) ................. 2009-047137

(51) Int. Cl.
*B65G 47/22* (2006.01)
*B65G 7/08* (2006.01)
*B07C 1/18* (2006.01)

(52) U.S. Cl.
USPC ........... 414/782; 414/759; 414/763; 414/768; 414/770

(58) Field of Classification Search
USPC ......... 414/782, 776, 777, 778, 779, 780, 781, 414/783, 784, 814, 815, 816, 754, 758, 760, 414/763, 768, 770
See application file for complete search history.

(56) References Cited

U.S. PATENT DOCUMENTS

| | | | | |
|---|---|---|---|---|
| 3,820,234 A | * | 6/1974 | Poincenot | ........................ 483/46 |
| 5,630,696 A | * | 5/1997 | Gordon | ......................... 414/782 |
| 6,430,796 B1 | | 8/2002 | Jones et al. | |

(Continued)

FOREIGN PATENT DOCUMENTS

| | | |
|---|---|---|
| CN | 1322607 | 11/2001 |
| CN | 1550463 | 12/2004 |

(Continued)

OTHER PUBLICATIONS

Japanese Decision to Grant a Patent issued Aug. 6, 2012 in corresponding Japanese Patent Application No. 2009-047137 with English translation.

(Continued)

*Primary Examiner* — Gregory Adams
*Assistant Examiner* — Lynn Schwenning
(74) *Attorney, Agent, or Firm* — Wenderoth, Lind & Ponack, L.L.P.

(57) ABSTRACT

A turnover apparatus includes a tower configured to travel on abase, a lifter configured to rise and fall along the tower, a target holding portion configured to hold a turnover target, a wheel traveling base, a wheel axle rotatably attached to the target holding portion, and a wheel axle lock. The wheel axle includes a wheel configured to roll on the wheel traveling base. The target holding portion is attached to the lifter via a rotation shaft parallel to the wheel axle. The wheel axle lock is configured to lock the wheel axle such that the wheel does not roll on the wheel traveling base and the wheel axle can rotate with respect to the target holding portion.

20 Claims, 24 Drawing Sheets

(56) References Cited

U.S. PATENT DOCUMENTS

| | | | |
|---|---|---|---|
| 6,935,619 B2* | 8/2005 | Chamoun | 254/10 B |
| 7,290,976 B2* | 11/2007 | Wadensweiler et al. | 414/590 |
| 7,703,358 B2* | 4/2010 | Ubinana Felix | 81/487 |
| 8,177,472 B2* | 5/2012 | Charlier et al. | 414/782 |
| 2002/0069531 A1* | 6/2002 | Walker et al. | 29/897.2 |
| 2004/0213659 A1* | 10/2004 | Lisec | 414/754 |
| 2009/0074555 A1* | 3/2009 | Murray et al. | 414/758 |
| 2009/0290968 A1* | 11/2009 | Tamura | 414/758 |

FOREIGN PATENT DOCUMENTS

| | | |
|---|---|---|
| CN | 201183260 | 1/2009 |
| JP | 53-122659 | 10/1978 |
| JP | 58-148099 | 9/1983 |
| JP | 4-331106 | 11/1992 |
| JP | 11-79335 | 3/1999 |
| JP | 3614612 | 1/2005 |

OTHER PUBLICATIONS

International Search Report issued Apr. 13, 2010 in International (PCT) Application No. PCT/JP2010/052382.

Chinese Office Action, with partial English translation, issued Apr. 3, 2013 in corresponding Chinese Patent Application No. 201080009600.4.

Canadian Notice of Allowance issued Apr. 17, 2013 in corresponding Canadian Patent Application No. 2,753,519.

Chinese Notification of the Decision to Grant a Patent Right for Invention, with English translation, issued Oct. 9, 2013 in corresponding Chinese Patent Application No. 201080009600.4.

* cited by examiner

TURNOVER APPARATUS

This application is based upon and claims the benefit of priority from Japanese Patent Application No. 2009-47137, filed on Feb. 27, 2009, the disclosure of which is incorporated herein in its entirely by reference.

TECHNICAL FIELD

The present invention relates to a turnover apparatus.

BACKGROUND ART

Referring to FIG. 1, an assembly process of a main wing of an aircraft is explained. An upper side panel 85 in an attitude with a convex face side 85a oriented upward and a concave face side 85b oriented downward is attached to an upper side of a wing structure 87, and a lower side panel 86 in an attitude with a convex face side 86a oriented downward and a concave face side 86b oriented upward is attached to a lower side of the wing structure 87.

In an upstream process of the assembly process, the upper panel 85 is turned over such that the convex face side 85a becomes oriented upward, and the lower side panel 86 is turned over such that the convex face side 86a becomes oriented downward.

Japanese patent No. 3614612 and Japanese Patent publication (JP-A-Heisei 4-331106) disclose conventional turnover apparatuses.

SUMMARY OF INVENTION

An object of the present invention is to provide a turnover apparatus, a turnover system, and a turnover method which can turn over a turnover target in two directions.

In a first aspect of the present invention, a turnover apparatus includes: a tower configured to travel on abase; a lifter configured to rise and fall along the tower; a target holding portion configured to hold a turnover target; a wheel traveling base; a wheel axle rotatably attached to the target holding portion; and a wheel axle lock. The wheel axle includes a wheel configured to roll on the wheel traveling base. The target holding portion is attached to the lifter via a rotation shaft parallel to the wheel axle. The wheel axle lock is configured to lock the wheel axle such that the wheel does not roll on the wheel traveling base and the wheel axle can rotate with respect to the target holding portion.

Preferably, the turnover apparatus further includes a control device. The control device causes the target holding portion to turn over in a first turnover direction by causing the lifter to fall in a state that the wheel axle lock does not lock the wheel axle and in a state that the tower is stopped with the rotation shaft is positioned in a first-direction forward side of the wheel axle. The control device causes the target holding portion to turn over in a second turnover direction reverse to the first turnover direction by controlling a travel of the tower and rise and fall of the lifter such that the rotation shaft executes circular motion of which a center is the wheel axle in a state that the wheel axle lock locks the wheel axle. The control device causes the tower to travel toward a first-direction backward side reverse to the first-direction forward side when turning over the target holding portion in the second turnover direction.

Preferably, the turnover apparatus further includes a coupler. The wheel traveling base includes: a fixed portion fixed with respect to the base; and a tower following portion configured to able to travel parallel to the tower. The wheel axle lock is provided to the tower following portion. The coupler couples the tower following portion to the tower.

Preferably, the wheel traveling base includes a wheel axle lifter configured to raise and lower the wheel axle.

Preferably, the target holding portion includes: a frame; and a clamp device attached to the frame. The wheel axle is rotatably attached to the frame. The frame is attached to the lifter via the rotation shaft. The clamp device clamps the turnover target.

Preferably, the clamp device includes a face plate configured to touch the turnover target. The face plate is exchangeable.

Preferably, the clamp device is attached to the frame such that a position of the clamp device is adjustable.

In a second aspect of the present invention, a turnover system includes: a panel edge support device configured to support an edge portion of a panel from a position under the edge portion; a panel face support device on which the panel leans; and a turnover apparatus. The turnover apparatus includes: a tower configured to travel on a base; a lifter configured to rise and fall along the tower; a panel holding portion configured to receive the panel from the panel edge support device and the panel face support device and hold the panel; a wheel traveling base; a wheel axle rotatably attached to the panel holding portion; and a wheel axle lock. The wheel axle includes a wheel configured to roll on the wheel traveling base. The panel holding portion is attached to the lifter via a rotation shaft parallel to the wheel axle. The wheel axle lock is configured to lock the wheel axle such that the wheel does not roll on the wheel traveling base and the wheel axle can rotate with respect to the panel holding portion.

Preferably, the panel edge support device includes: a panel receiving portion configured to support the edge portion; and feeding devices configured to raise and lower the panel receiving portion and to move the panel receiving portion forward and backward in travel directions of the tower.

Preferably, the panel receiving portion includes: a sliding body configured to be raised and lowered and to be moved forward and backward by the feeding devices; a block supporting portion configured to rise and fall with respect to the sliding body; a panel receiving block attached to the block supporting portion and configured to support the edge portion; and a first spring configured to biases the block supporting portion upward. The sliding body includes a stopper. When bumping against the stopper, the block supporting portion stops falling with respect to the sliding body.

Preferably, the panel receiving block is attached to the block supporting portion such that the panel receiving block can move forward and backward in the traveling directions of the tower. The panel receiving portion includes a second spring configured to receive force of a traveling direction of the tower acting on the panel receiving block.

Preferably, the panel receiving portion includes a notched portion. The panel edge support device includes a detector configured to detect that the edge portion is positioned at the notched portion.

Preferably, the turnover system further includes a protection cover attached to the edge portion. The edge portion includes: a first portion covered by the protection cover; and a second portion not covered by the protection cover. The detector includes: a light emitting portion; and a light receiving portion. The light emitting portion and the light receiving portion are arranged such that the second portion blocks a light path between the light emitting portion and the light receiving portion when the protection cover touches the notched portion.

Preferably, the turnover system further includes a protection cover attached to the edge portion. The protection cover touches the panel edge support device.

Preferably, the panel face support device includes: a plurality of panel support portions which support the panel; and a plurality of feeding devices configured to respectively move the plurality of panel support portions forward and backward. The plurality of feeding devices arrange the plurality of panel support portions on a predetermined curved plane.

Preferably, the turnover system further includes a positioning tool. The positioning tool includes: a table; a slide guide provided to the table; a sliding base configured to slide along the slide guide; a laser pointer supported by the sliding base; and a locking portion configured to lock the sliding base to the table at arbitrary one of a plurality of predetermined positions.

In a third aspect of the present invention, a turnover method including: a step of turning over a target holding portion in a first turnover direction; and a step of turning over the target holding portion in a second turnover direction reverse to the first turnover direction. A wheel axle is rotatably attached to the target holding portion. The target holding portion is attached to a lifter via a rotation shaft parallel to the wheel axle. The lifter is configured to able to rise and fall along the tower. The step of turning over the target holding portion in the first turnover direction includes a step of a wheel of the wheel axle rolling on a wheel traveling base while lowering the lifter. The step of turning over the target holding portion in the second turnover direction includes a step of the tower traveling and the lifter rising and falling such that the rotation shaft execute circular motion of which a center is the wheel axle while fixing a position of the wheel axle.

According to the present invention, there are provided a turnover apparatus, a turnover system, and a turnover method which can turn over a turnover target in two directions.

BRIEF DESCRIPTION OF DRAWINGS

The above and other objects, advantages, and features of the present invention will be more apparent from the description of embodiments taken in conjunction with the accompanying drawings, in which.

DESCRIPTION OF EMBODIMENTS

With reference to the accompanying drawings, embodiments of a turnover apparatus, a turnover system, and a turnover method according to the present invention will be described below.

First Embodiment

Figure 1:
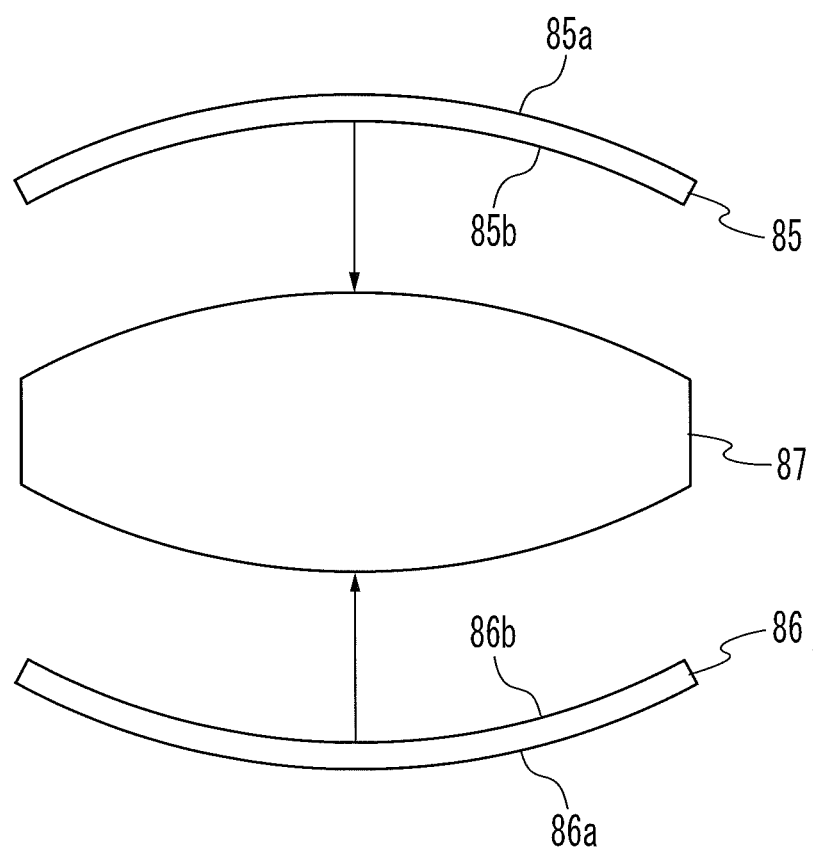
FIG. 1 shows an assembly process of a main wing.
Figure 2:
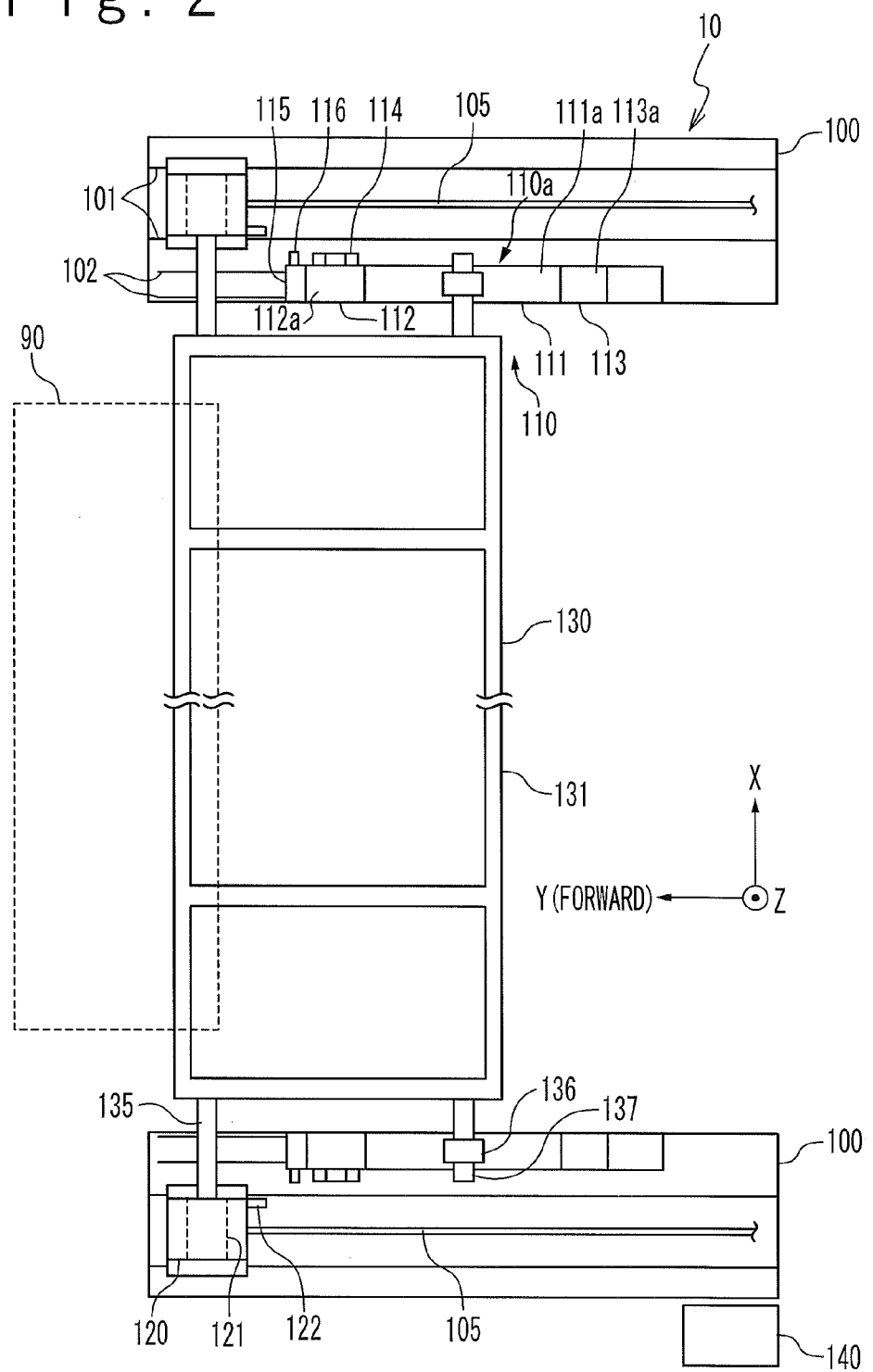
FIG. 2 is a top view of a turnover apparatus of a turnover system according to a first embodiment of the present invention.

Referring to FIG. 2, a turnover system according to a first embodiment of the present invention includes a turnover apparatus 10. The turnover apparatus includes tower traveling bases 100, wheel traveling bases 110, traveling towers 120, lifters 121, a panel holding portion 130, rotation shafts 135, wheel axles 137, and a control device 140. In FIG. 2, X-direction, Y-direction, and Z-direction are shown. The X-direction is a first horizontal direction, the Y-direction is a second horizontal direction perpendicular to the first horizontal direction, and the Z-direction is a vertical direction. The tower traveling base 100 includes tower guides 101, following portion guides 102, and a feeding device 105. The feeding device 105 drives the traveling tower 120 in the Y-direction and positions the traveling tower 120. The feeding device 105 includes, for example, a ball screw. The traveling tower 120 is guided by the tower guides 101 to travel on the tower traveling base 100. The traveling tower 120 includes a coupler 122. The lifter 121 is guided by the traveling tower 120 to rise and fall along the traveling tower 120 in the Z-direction. The wheel traveling base 110 includes a fixed portion 111 fixed to the tower traveling base 100, a tower following portion 112 positioned in a Y-direction forward side of the fixed portion 111, a wheel axle lifter 113 positioned in a Y-direction backward side of the fixed portion 111, a wheel axle lock 114, and a coupler 115. The wheel axle lock 114 and the coupler 115 are provided to the tower following portion 112. The coupler 115 includes a coupling pin 116. When the coupling pin 116 engages the coupler 122, the traveling tower 120 and the tower following portion 112 are coupled. When the engagement between the coupling pin 116 and the traveling tower 120 is released, the coupling between the traveling tower 120 and the tower following portion 112 is released. The tower following portion 112 is guided by the following portion guides 102 to travel on the tower traveling base 100. The wheel traveling base 110 has a traveling surface 110a. The traveling surface 110a includes a traveling surface 111a as an upper surface of the fixed portion 111, a traveling surface 112a as an upper surface of the tower following portion 112, and a traveling surface 113a as an upper surface of the wheel axle lifter 113. The panel holding portion 130 includes a frame 131. The wheel axle 137 is rotatably attached to the frame 131. The wheel axle 137 includes a wheel 136 which rolls on the traveling surface 110a. The frame 131 is attached to the lifter 121 via the rotation shaft. The rotation shaft 135 and the wheel axle 137 are parallel to the X-direction. A region 90 is positioned in the Y-direction forward side of the panel holding portion 130.

Figure 3:
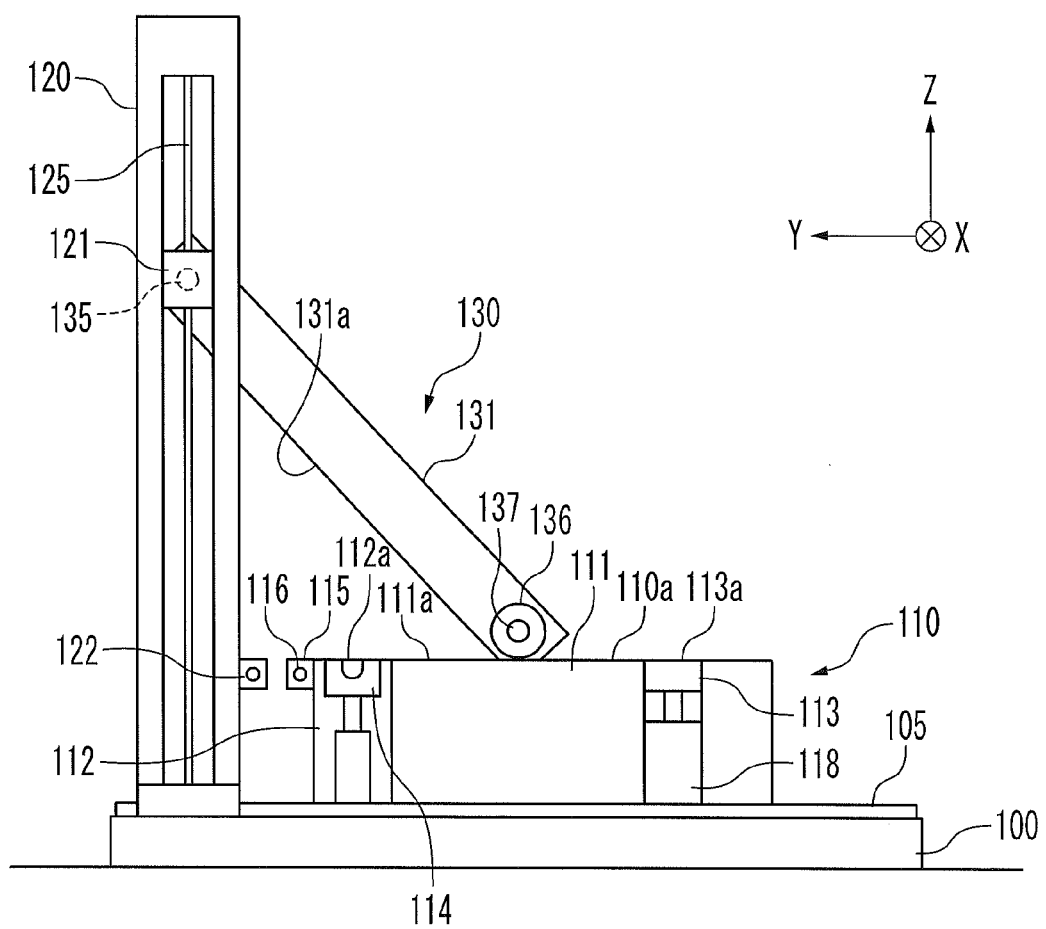
FIG. 3 is a side view of the turnover apparatus.

Referring to FIG. 3, the traveling tower 120 includes a feeding device 125. The feeding device 125 drives the lifter 121 upward and downward and positions the lifter 121. The feeding device 125 includes, for example, a ball screw. The traveling surface 111a, the traveling surface 112a, and the traveling surface 113a are arranged at the same level. The turnover apparatus 10 includes feeding devices 118. The feeding device 118 drives the wheel axle lifter 113 upward and downward and positions the wheel axle lifter 113. Since the wheel axle lifter 113 rises and falls, the traveling surface 113a is arranged at a higher position and a lower position than the traveling surface 111a. When the wheel 136 is on the traveling surface 113, rise and fall of the wheel axle lifter 113 causes rise and fall of the wheel axle 137. When the wheel axle lock 114 rises to engage the wheel axle 137 in a state that the wheel 136 is on the traveling surfaces 112a, the wheel axle 137 is locked such that the wheel 136 does not roll on the traveling surface 110a and the wheel axle 137 can rotate with respect to the panel holding portion 130. When the wheel axle lock 114 falls to release the engagement between the wheel axle lock 114 and the wheel axle 137, the wheel 136 can freely roll on the traveling surface 110a. The panel holding portion 130 holds a turnover target. The frame 131 includes a holding side 131a as a side at which the turnover target is held.

Figure 4:
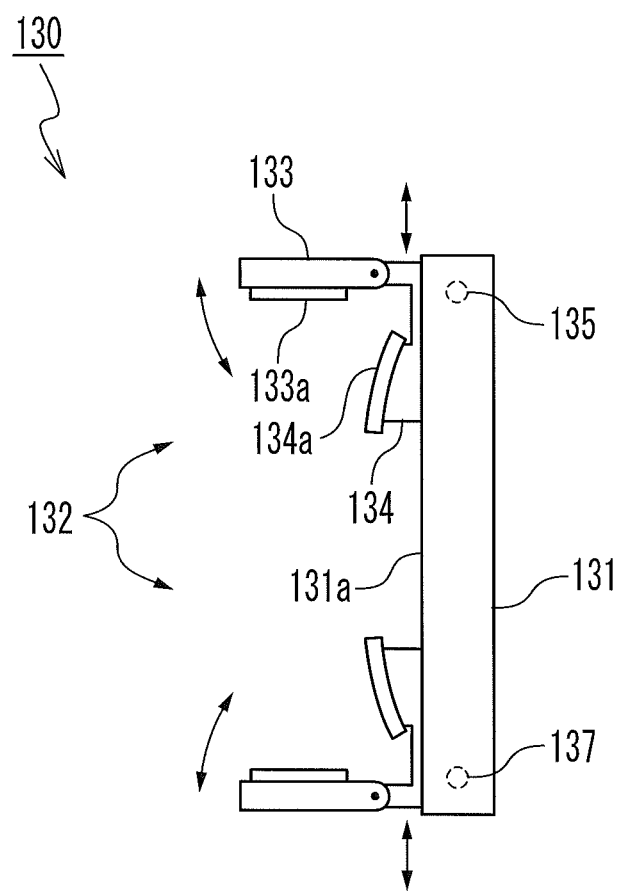
FIG. 4 is a side view of a panel holding portion of the turnover apparatus.

Referring to FIG. 4, the panel holding portion 130 includes clamp devices 132 provided at the holding side 131a. The clamp devices clamp the turnover target. The clamp devices 132 are attached to the frame 131 such that positions of the clamp devices 132 are adjustable. The positions of the clamp devices 132 are adjusted to match the size of the turnover target. The clamp device 132 includes a movable face plate support portion 133, a face plate 133a attached to the movable face plate support portion 133, a fixed face plate support portion 134, and a face plate 134a attached to the fixed face plate support portion 134. The fixed face plate support portion 134 is attached to the frame 131 such that the position of the fixed face plate support portion 134 is adjustable. The fixed face plate support portion 134 supports the movable face plate support portion 133 such that the movable face plate support portion 133 can swing. The clamp device 132 clamps the turnover target such that the turnover target is placed between the face plate 133a and the face plate 134a. At this time, the faceplate 133a and the faceplate 134a touch the turnover target. The face plate 133a and the face plate 134a are exchangeable. By using the face plate 133a and the face plate 134a which match the shape of the turnover target, the turnover target is prevented from being damaged.

Figure 5:
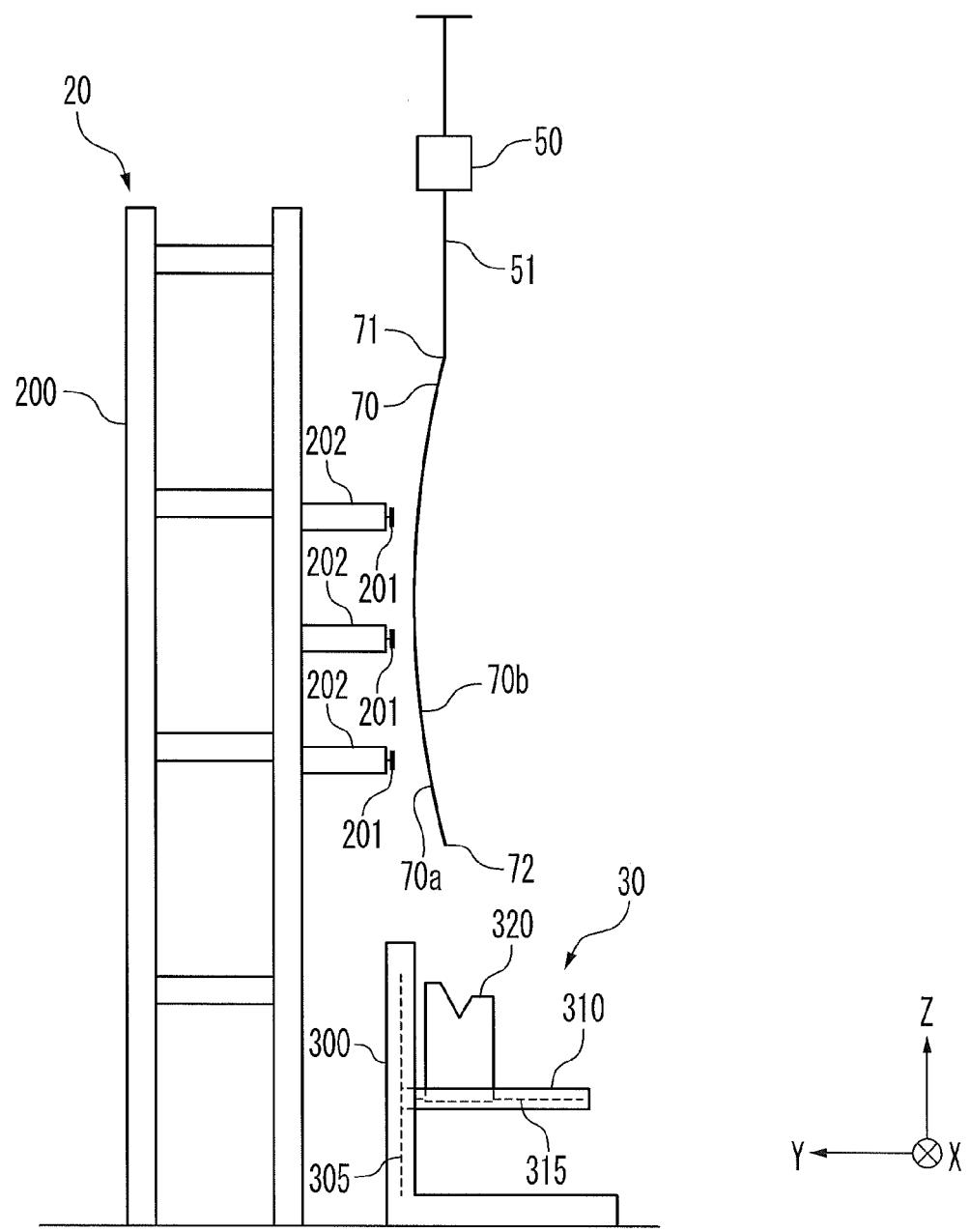
FIG. 5 is a side view of a panel face support device and a panel edge support device of the turnover system.

Referring to FIG. 5, the turnover system according to the present embodiment includes a panel face support device 20 and a plurality of panel edge support devices 30. The panel face support device 20 and the panel edge support devices 30 are arranged in the region 90. The plurality of panel edge support devices 30 are arranged in the Y-direction forward side of the panel holding portion 130, and the panel face support device 20 is arranged in the Y-direction forward side of the plurality of panel edge support devices 30. The plurality of panel edge support devices 30 are arranged in the X-direction.

The panel face support device 20 includes a frame structure 200, a plurality of panel support portions 201, a plurality of feeding devices 202. The frame structure 200 supports the plurality of feeding devices 202. The plurality of feeding devices 202 respectively support the plurality of panel support portions 201. The plurality of feeding devices 202 respectively move the plurality of panel support portions 201 forward and backward in the Y-direction. The plurality of panel support portions 201 are distributed in a region spreading in the X-direction and the Z-direction. For example, the plurality of panel support portions 201 are arranged along a plurality of straight lines parallel to the X direction. The plurality of straight lines are different from each other in Z-direction position.

The panel edge support device 30 includes a frame base 300, a Z-axis sliding body 310, and a panel receiving portion 320. The Z-axis sliding body 310 is supported by the frame base 300 such that the Z-axis sliding body 310 can rise and fall in the Z-direction. The frame base 300 includes a feeding device 305. The feeding device 305 raises and lowers the Z-axis sliding body 310 and positions the Z-axis sliding body 310. The feeding device 305 includes, for example, a ball screw. The panel receiving portion 320 is supported by the Z-axis sliding body 310 such that the panel receiving portion 320 can move forward and backward in traveling directions (Y-direction) of the traveling tower 120. The Z-axis sliding body includes a feeding device 315. The feeding device 315 moves the panel receiving portion 320 forward and backward in the Y-direction and positions the panel receiving portion 320. The feeding device 315 includes, for example, a ball screw. The feeding device 305 and the feeding device 315 raise and lower the panel receiving portion 320 and move the panel receiving portion 320 forward and backward in the traveling directions of the traveling tower 120.

A main wing panel 70 as the turnover target is conveyed to the position between the panel holding portion 130 and the panel face support device 20 in a state that the main wing panel 70 is hung via a wire 51 from a load bar 50 extending in the X direction. The conveyance direction of the main wing panel 70 is the X-direction. The main wing panel 70 includes an edge portion 71, an edge portion 72, a convex face side 70a, and a concave face side 70b. The edge portion 71 is one of a leading edge portion and a trailing edge portion of the main wing panel 70, and the edge portion 72 is the other of the leading edge portion and the trailing edge portion. The main wing panel 70 is hung by the wire 51 at the edge portion 71 in a state that the convex face side 70a is oriented toward the Y-direction forward side and the edge portion 72 is positioned at the lower side.

Figure 6:
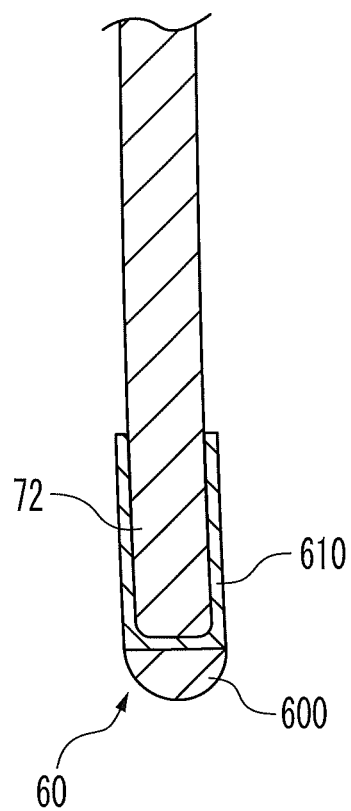
FIG. 6 a local sectional view of a main wing panel.

Referring to FIG. 6, protection covers 60 of the turnover system according to the present embodiment is described. The protection covers 60 are attached to the edge portion 72 before the main wing panel 70 is conveyed to the position between the panel holding portion 130 and the panel face support device 20. The protection cover 60 includes a protection member 600 and a protection member fixing portion 610 which fixes the protection member 610 to the edge portion 72. The protection cover 60 prevents the edge portion 72 from being damaged.

Figure 7:
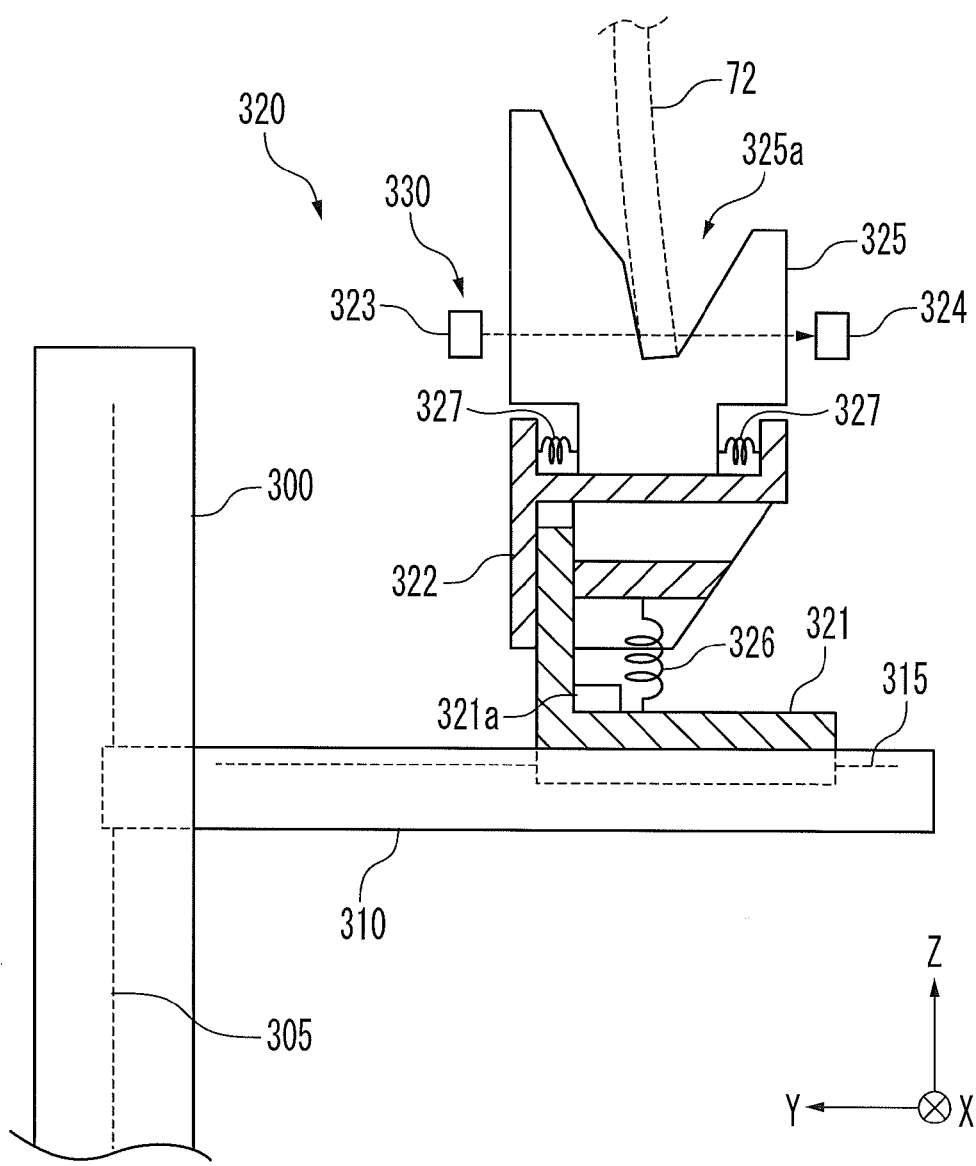
FIG. 7 shows a detailed structure of a panel receiving portion of the panel edge support device.

Referring to FIG. 7, the panel receiving portion 320 is described. The panel receiving portion 320 includes a Y-axis sliding body 321, a block supporting portion 322, a panel receiving block 325, a spring 326, springs 327, and a detector 330. The Y-axis sliding body 321 is moved forward and backward in the Y-direction by the feeding device 315. The Y-axis sliding body 321 is arose and lowered and is moved forward and backward in the Y-direction by the feeding devices 305 and 315. The Y-axis sliding body 321 includes a stopper 321a. The block supporting portion 322 is supported by the Y-axis sliding body 321 such that the block supporting portion 322 can rise and fall with respect to the Y-axis sliding body 321. The spring 326 is attached to the Y-axis sliding body 321 and biases the block supporting portion 322 upward. The panel receiving block 325 is attached to block supporting portion 322 such that the panel receiving block 325 can move forward and backward in the Y-direction with respect to the block supporting portion 322. The spring 327 is provided between the block supporting portion 322 and the panel receiving block 325 such that the spring 327 receives force of the Y-direction acted on the panel receiving block 325. A V-shaped notched portion 325a is formed in the panel receiving block 325. The panel receiving block 325 touches the protection member 600. The detector 330 includes a light emitting portion 323 and a light receiving portion 324. The light emitting portion 323 and the light receiving portion 324 are attached to the block supporting portion 322 or the panel receiving block 325 such that the light emitting portion 323 and the light receiving portion 324 face to each other in the Y-direction. The light emitting portion 323 and the light receiving portion 324 are arranged such that a light path between them is off-set in the X-direction from the notched portion 325a.

Figure 8:
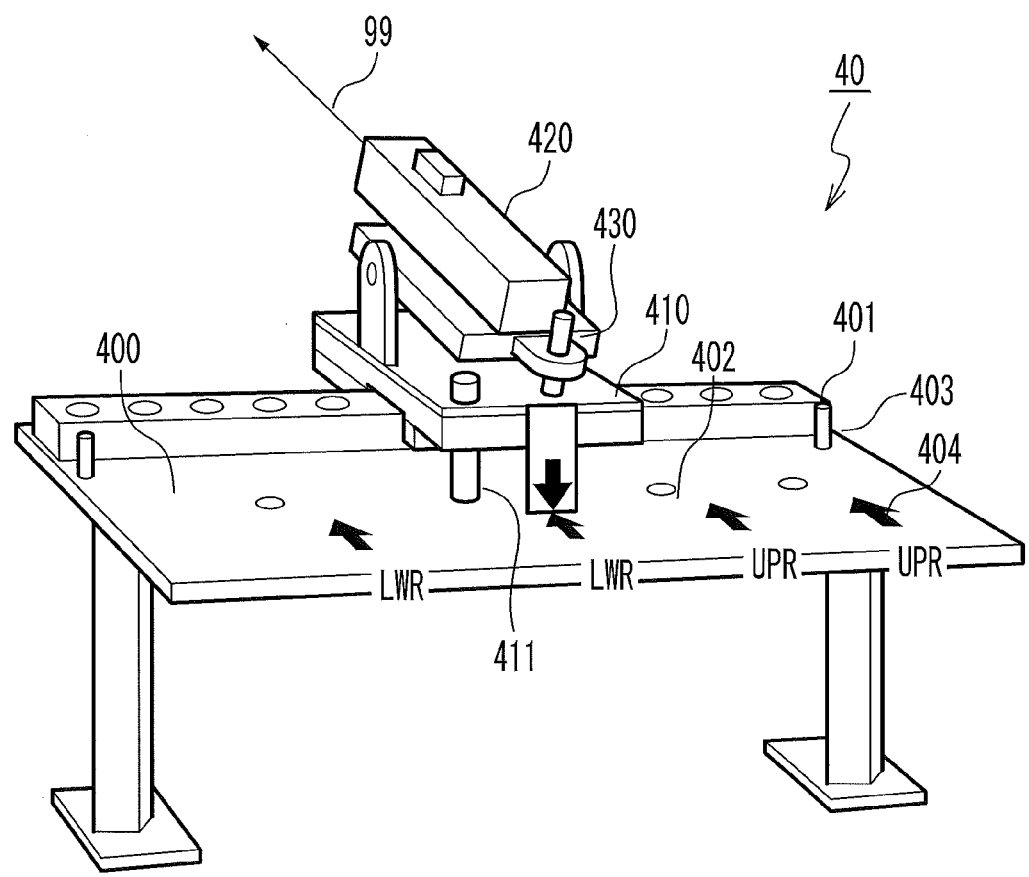
FIG. 8 is a perspective view of a positioning tool of the turnover system.

Referring to FIG. 8, a positioning tool 40 of the turnover system according to the present embodiment is described. The positioning tool 40 includes a table 400, a sliding base 410, a laser pointer 420, and an angle adjusting bolt 430. The table 400 includes a slide guide 401 and stopper bolts 403. A plurality of holes 402 and indexing marks 404 are provided to the table 400. The plurality of holes 402 respectively correspond to the plurality of indexing marks 404. The sliding base 410 includes a fixing pin 411. The sliding base 410 slides along the slide guide 401. The stopper bolts 403 limit the slide of the sliding base 403 in a definite range. The laser pointer 420 is supported by the sliding base 410 and emits a laser beam 99. The angle adjusting bolt 430 is used to adjust the emission direction of the laser beam 99. The fixing pin 411 and the holes 402 lock the sliding base 410 to the table 400 at arbitrary one of a plurality of predetermined positions. The plurality of predetermined positions respectively correspond to a case that the main wing panel 70 is an upper side panel of a right main wing, a case that the main wing panel 70 is a lower side panel of the right main wing, a case that the main wing panel 70 is an upper side panel of a left main wing, and a case that the main wing panel 70 is a lower side panel of the left main wing.

A turnover method using the turnover system according to the present embodiment is described below. At first, there is described a case that the main wing panel 70 is a lower side panel.

Referring to FIG. 5, the main wing panel 70 is conveyed to the position between the panel holding portion 130 and the panel face support device 20. Since the edge portion 71 is hung by the wire 51, the own weight of the main wing panel 70 decreases its camber compared with the designed shape. Here, the panel edge support devices 30 are located under the main wing panel 70.

Figure 9:
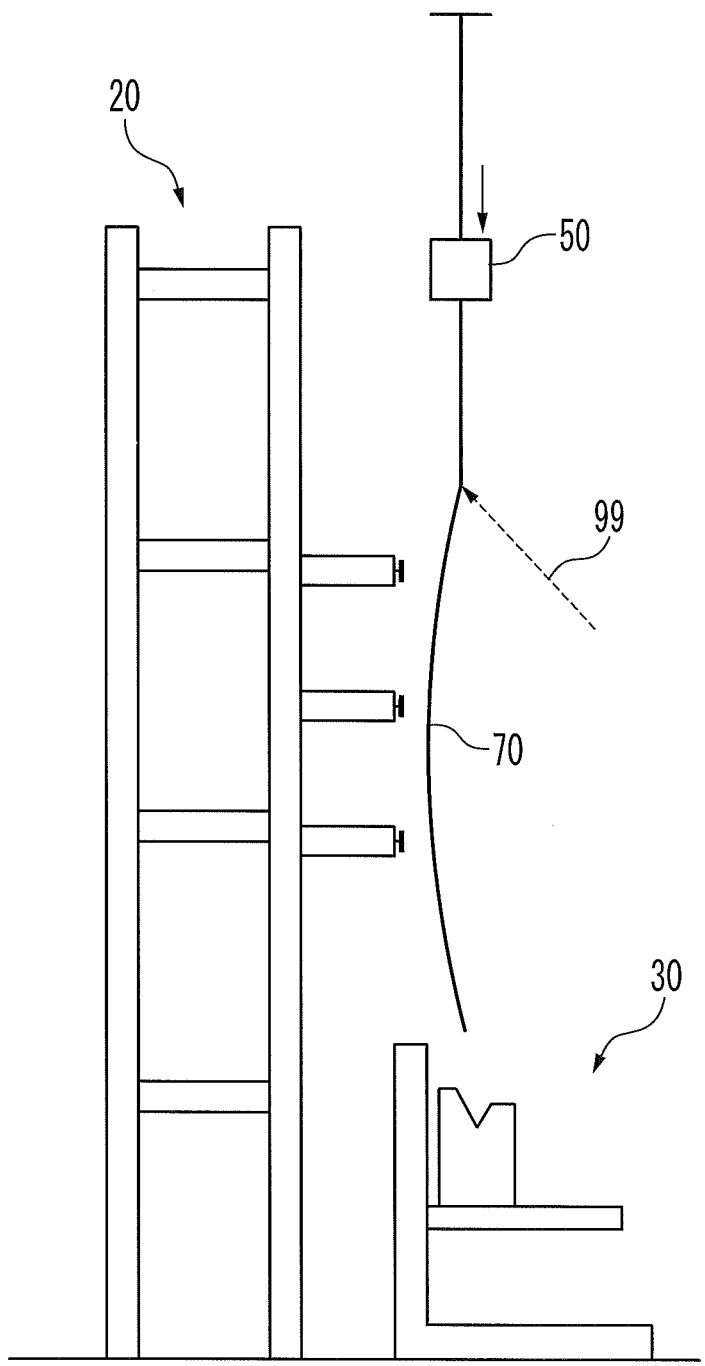
FIG. 9 shows a step of lowering the main wing panel hung from a load bar.

Referring to FIG. 9, the load bar 50 is lowered to a predetermined level. After that, the load bar 50 is moved in the X-direction to adjust the X-direction position of the main wing panel 70 such that the laser beam 99 is irradiated on a predetermined point of the main wing panel 70. Since the position of the main wing panel 70 is directly confirmed by using the laser beam 99, the alignment of the main wing panel 70 can be carried out exactly.

Figure 10:
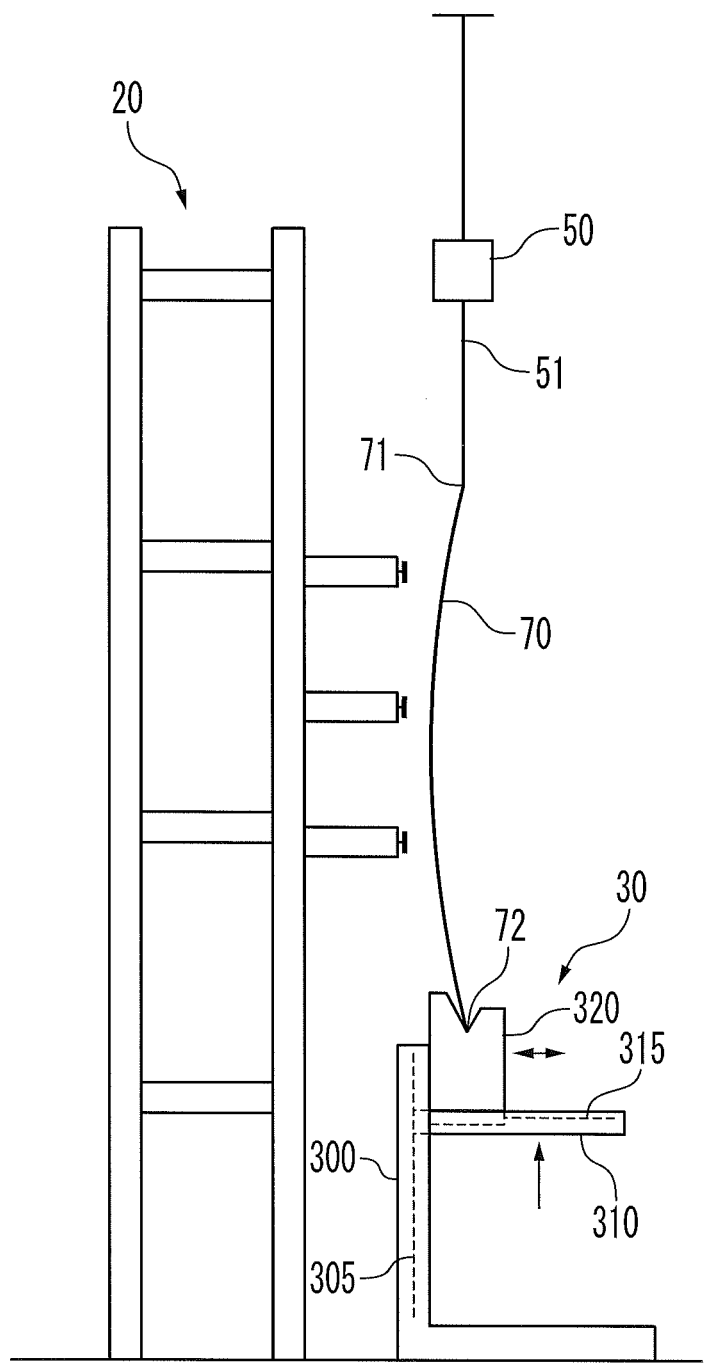
FIG. 10 shows a step of the panel receiving portion engaging an edge portion of the main wing panel.

Referring to FIG. 10, the feeding device 305 and the feeding device raise the panel receiving portion 320 to a predetermined level while adjusting the Y-direction position of the panel receiving portion 320 (or after the Y-direction position of the panel receiving portion 320 is adjusted) such that the edge portion 72 engages the panel receiving block 325. At this time, the edge portion 72 does not reach the bottom of the notched portion 325a.

Figure 11:
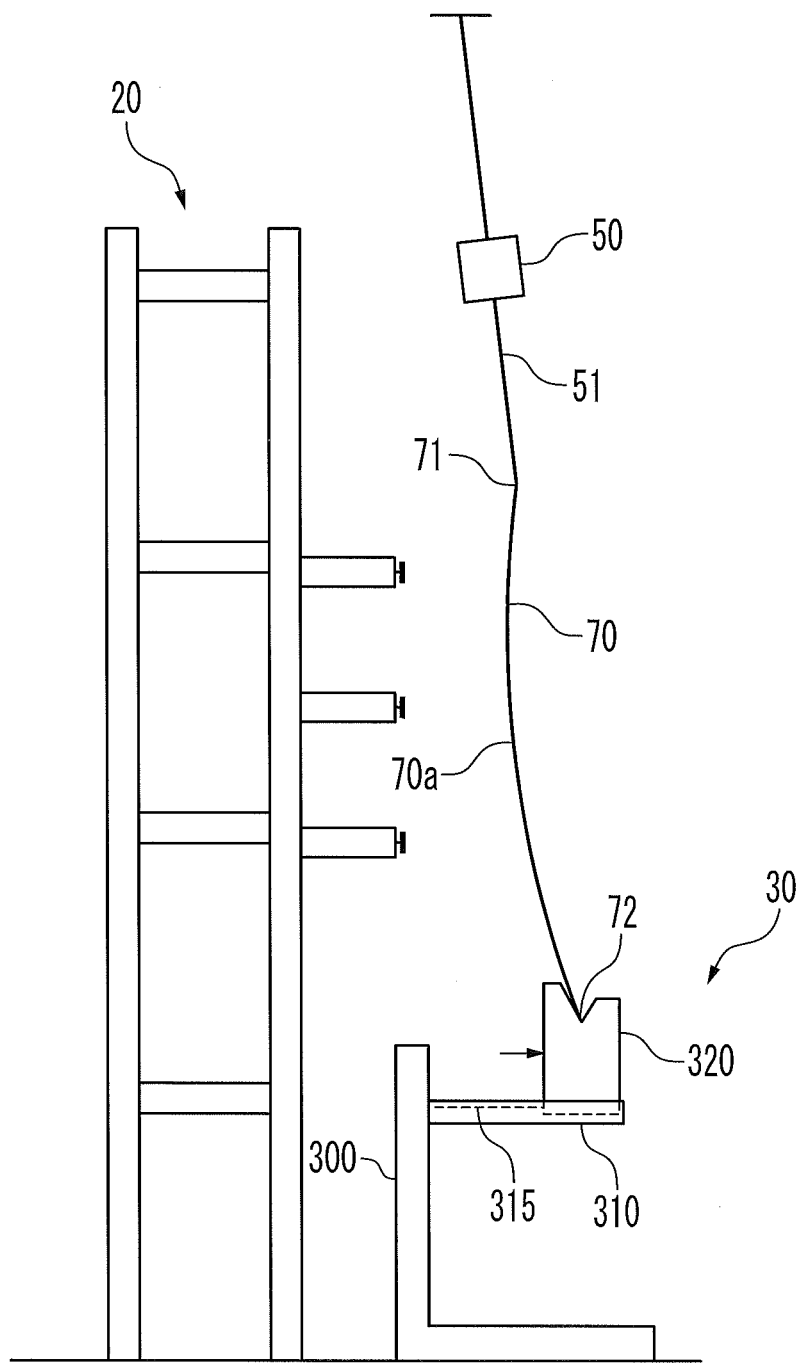
FIG. 11 shows a step of positioning the edge portion of the main wing panel.

Referring to FIG. 11, the feeding device 315 moves the panel receiving portion 320 (more concretely, the y-axis sliding body 321) toward the Y-direction backward side to a predetermined Y-direction position. Consequently, the edge portion 72 is moved toward the Y-direction backward side, and the main wing panel 70 is tilted such that the convex face side 70a is oriented obliquely downward.

Figure 12:
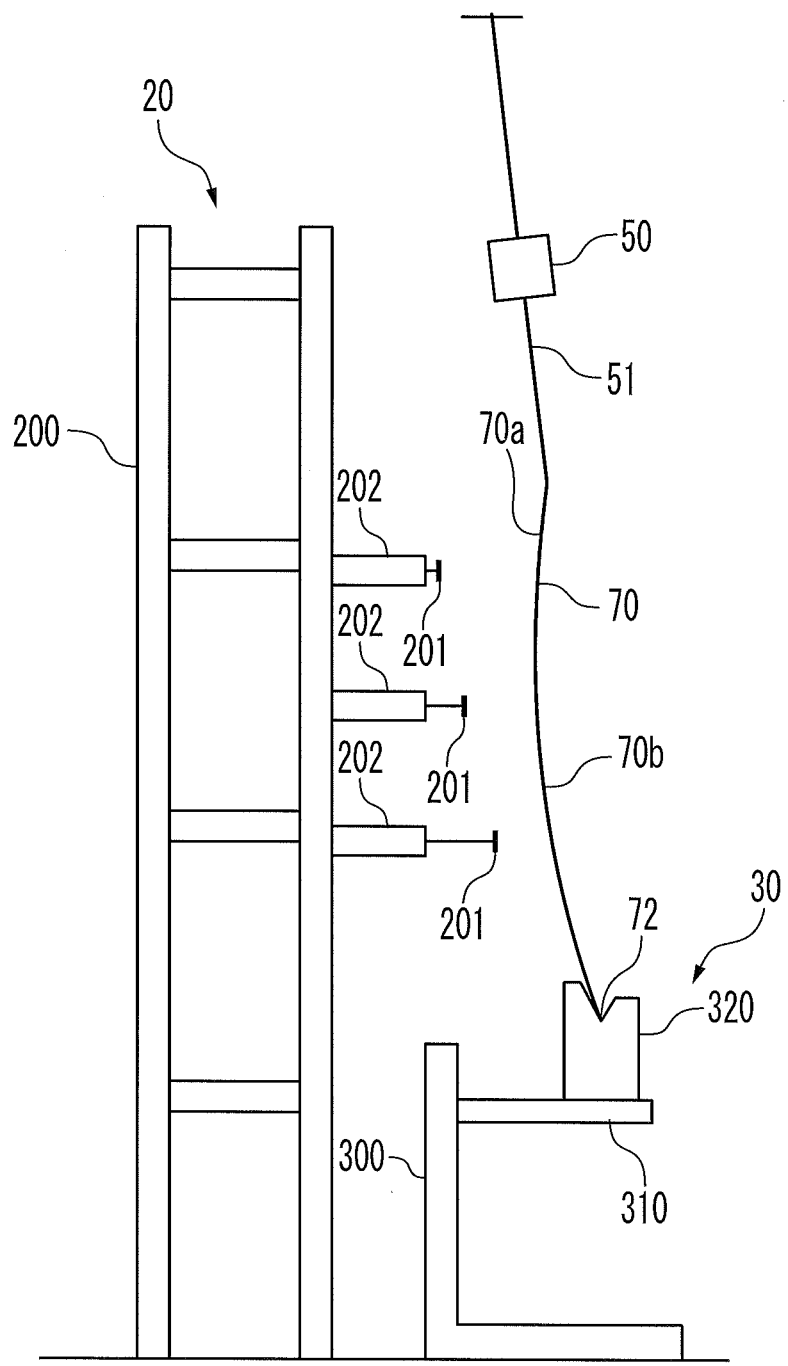
FIG. 12 shows a step of positioning panel support portions of the panel face support device.

Referring to FIG. 12, the plurality of feeding devices 202 arranges the plurality of panel support portions 201 on a predetermined curved plane.

Figure 13:
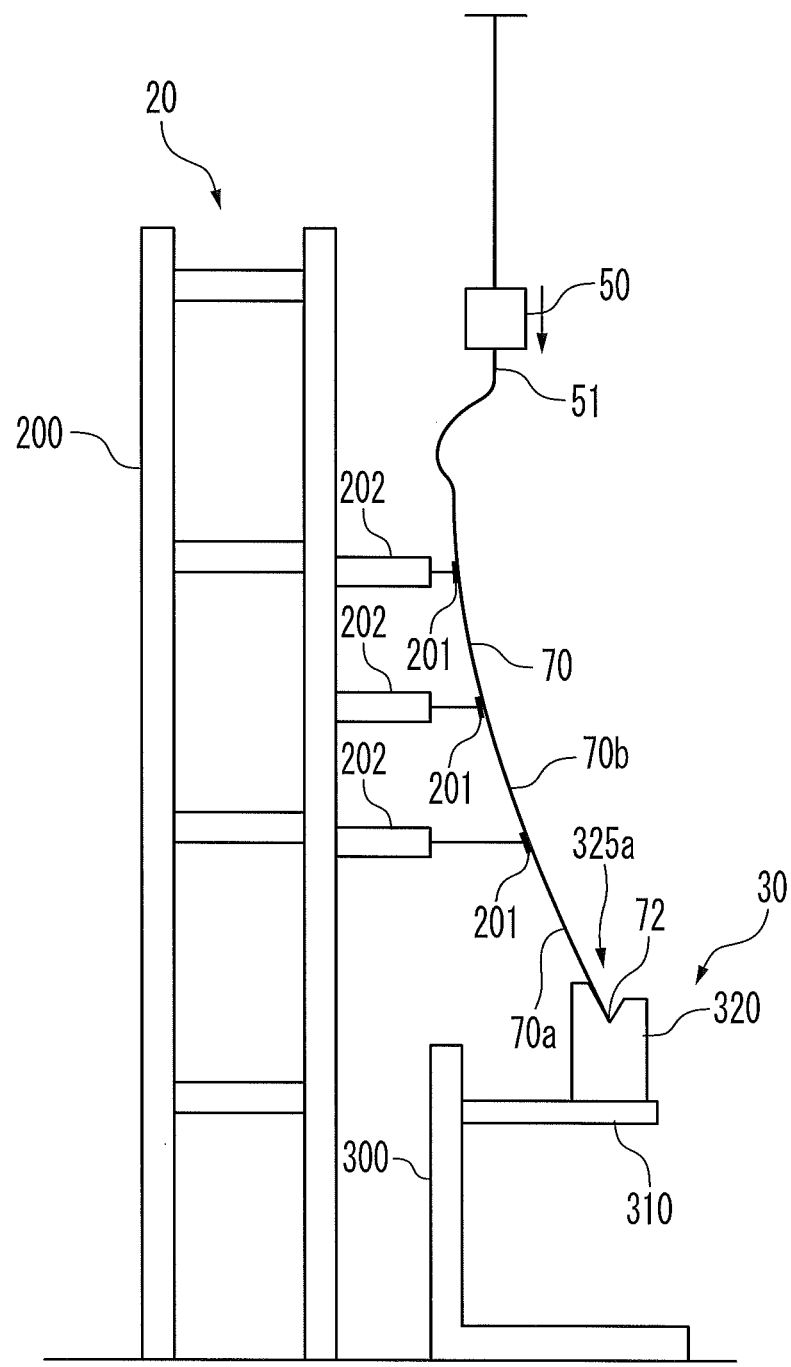
FIG. 13 shows a step of leaning the main wing panel on the panel support portions.

Referring to FIG. 13, the load bar 50 is lowered to lean the main wing panel 70 on the panel face support device 20. The plurality of panel support portions touch the convex face side 70a and support the main wing panel 70. At this time, the protection member 600 slips along a slope of the notched portion 325a and is arranged at the bottom portion of the notched portion 325a. The spring 326 absorbs the shock due to the bump between the protection member 600 and the bottom portion of the notched portion 325a. From the point of view of slippery degree and abrasive resistance, it is preferred that the protection member 600 and the panel receiving block 325 are formed by MC nylon (registered trade mark). The wire 51 is sagged and thus, the weight of the main wing panel 70 acted on the panel receiving block 325 is increased. Therefore, the block supporting portion 322 falls with respect to the Y-axis sliding body 321 and bumps against the stopper 321a to be stopped. The panel receiving block 325 supports the edge portion 72 from a position under the edge portion 72 in a state that the edge portion 72 is arranged at the notched portion 325a. This causes the main wing panel 70 to have the designed shape.

When the detector 330 detects that the edge portion 72 is appropriately arranged at the notched portion 325a, the method proceeds to the next step. The edge portion 72 includes a first portion covered by the protection cover 60 and a second portion not covered by the protection cover 60. In a state that the protection cover 60 touches the notched portion 325a, the second portion blocks the light path between the light emitting portion 323 and the light receiving portion 324. Based on the blocking, the detector 330 detects that the edge portion 72 is appropriately arranged at the notched portion 325a. Since the detector 330 is used to directly detect the position of the edge portion 72, the alignment of the edge portion 72 can be carried out exactly.

Figure 14:
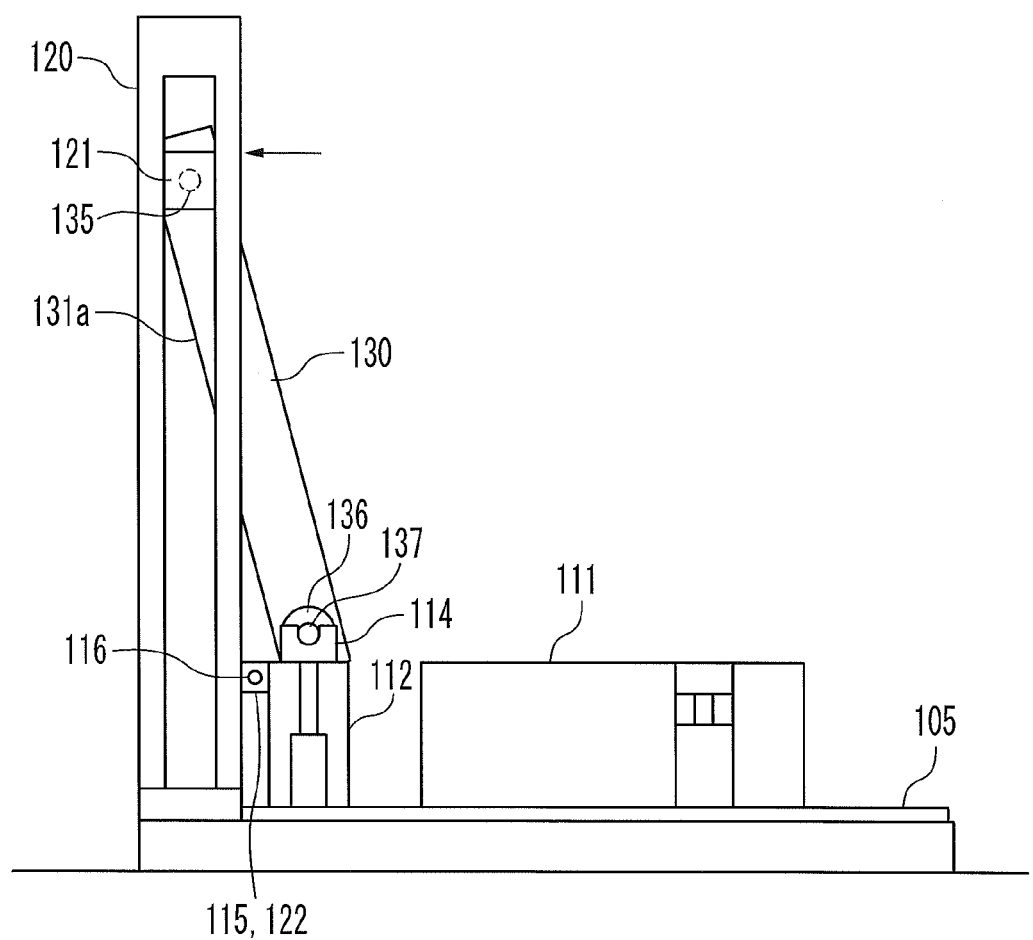
FIG. 14 shows a step of moving the panel holding portion forward to a main wing panel receiving position.

Referring to FIG. 14, the control device 140 causes the coupler 115 and the coupler 122 to couple the traveling tower 120 and the tower following portion 122 and causes the wheel axle lock 114 to lock the wheel axle 137 such that wheel 136 does not roll on the traveling surface 112a. The lifter 121 and the rotation shaft 135 are arranged in Y-direction forward side and above of the wheel axle 137. The holding side 131a is oriented obliquely downward toward Y-direction forward side. The control device 140 causes the feeding device 105 to travel the traveling tower 120 toward Y-direction forward side. The lifter 120, the panel holding portion 130, and the tower following portion 112 are moved together with the traveling tower 120 toward the Y-direction forward side. As a result, the panel holding portion 130 is moved to a predetermined main wing panel receiving position in a state that clamp devices 132 are opened.

Figure 15:
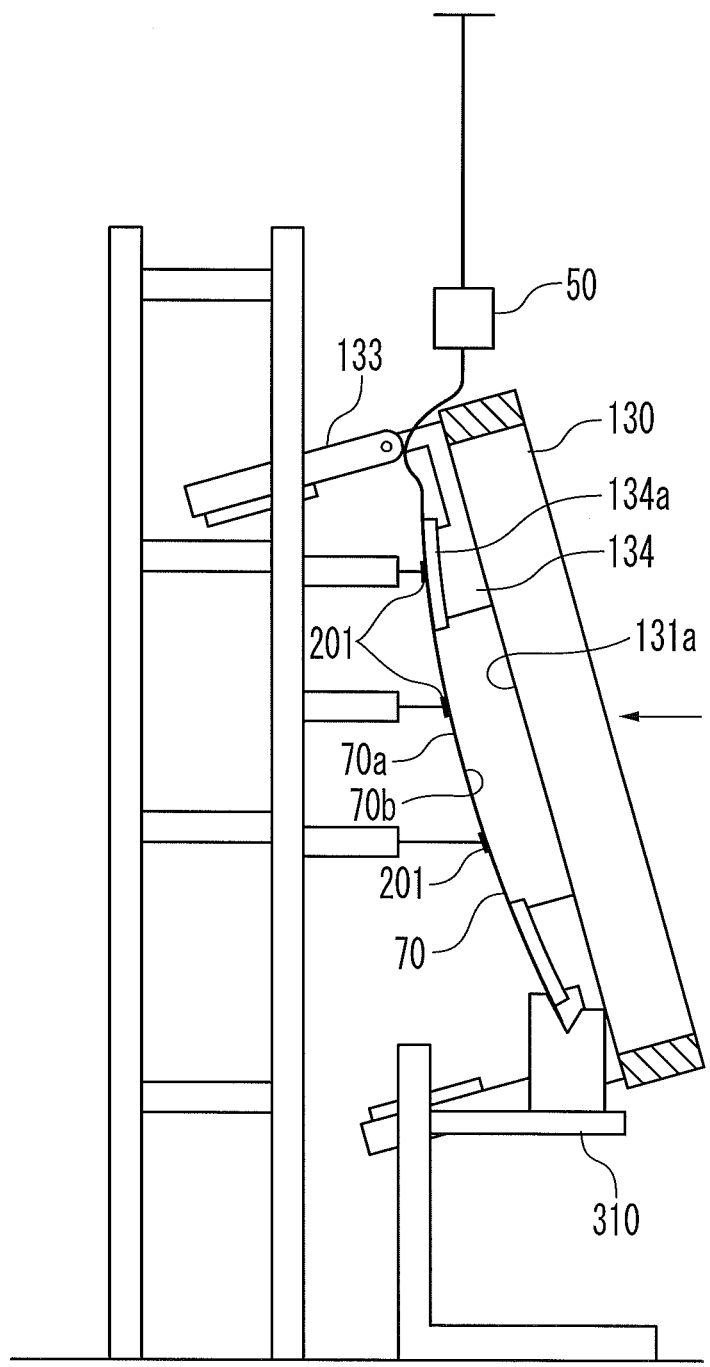
FIG. 15 shows a positional relationship between the main wing panel and the panel holding portion at the main wing panel receiving position.

Referring to FIG. 15, after the panel holding portion 130 moves to the predetermined main wing panel receiving position, the control device 140 causes the feeding device 105 to stop the traveling tower 120. As a result, the panel holding portion 130 stops at the position such that a small gap is formed between the face plate 134a and the concave face side 70b. Even when the face plate 134a bumps against the concave face side 70b, the springs 327 prevent the main wing panel 70 from being damaged.

Figure 16:
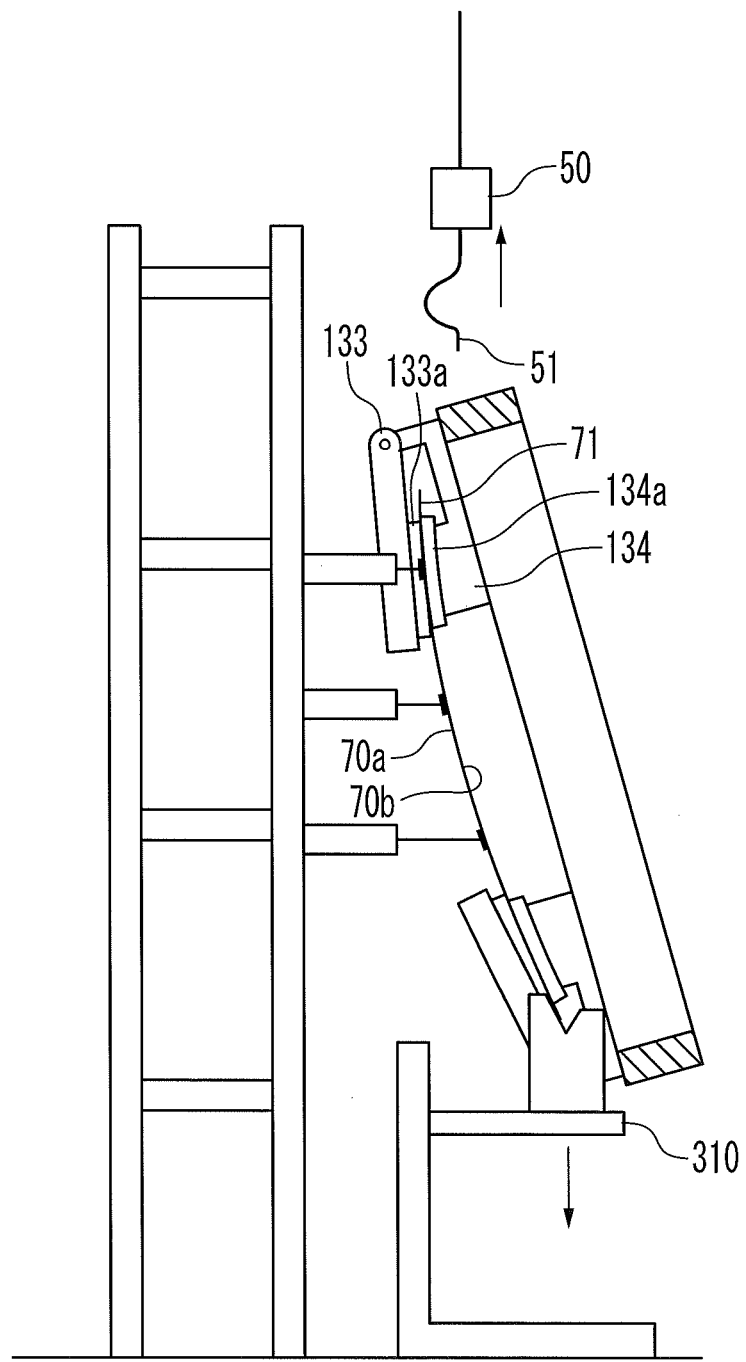
FIG. 16 shows a step of the panel holding portion clamping the main wing panel.

Referring to FIG. 16, the control device 140 causes the clamp devices 132 to clamp and hold the main wing panel 70. The main wing panel 70 is held by the panel holding portion 130 such that the convex face side 70a and the holding side 131a are oriented toward the same direction. The clamp device 132 clamps the main wing panel 70 such that the face plate 133a touches the convex face side 70a and the face plate 134a touches the concave face side 70b. Since clamp devices 132 hold the main wing panel 70 such that the main wing panel 70 keeps the designed shape, the main wing panel 70 is prevented from being damaged. After the panel holding portion 130 receives the main wing panel 70 from the panel face support device 20 and the panel edge support devices 30 in this way, the wire 51 is detached from the edge portion 71, the load bar 50 is raised, and the Z-axis sliding bodies 310 are lowered.

Figure 17:
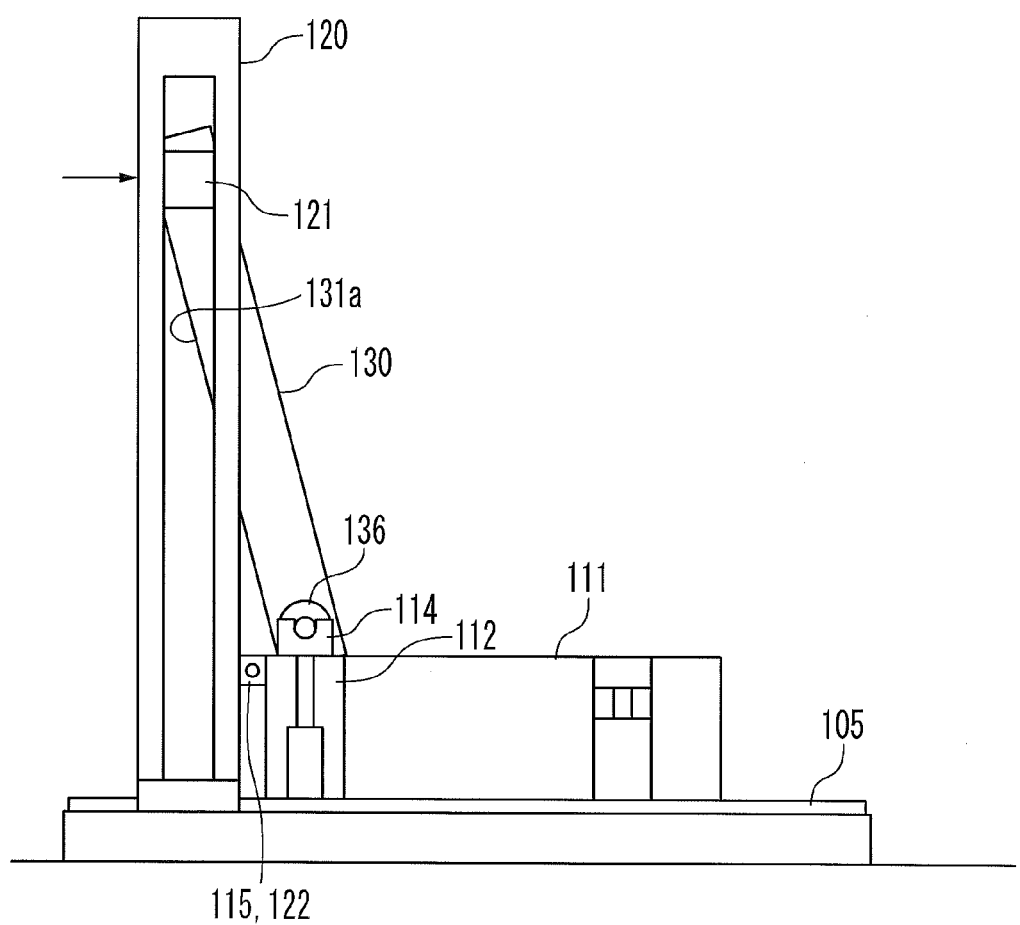
FIG. 17 shows a step of moving the panel holding portion backward from the main wing panel receiving position.

Referring to FIG. 17, the control device 140 causes the feeding device 105 to move the traveling tower 120 toward Y-direction backward side and to stop at a position that the traveling surface 112a is connected to the traveling surface 111a.

Figure 18:
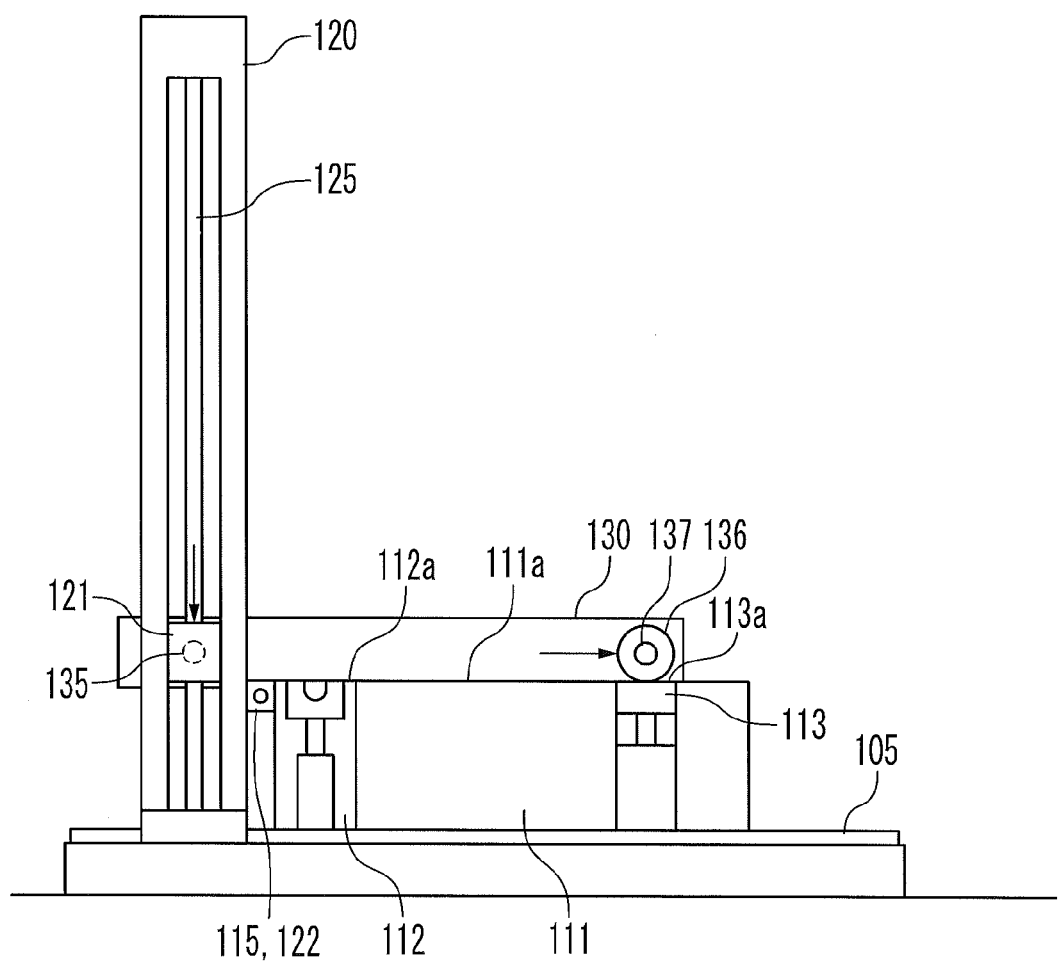
FIG. 18 shows a step of turning over the panel holding portion in a first turnover direction.

Referring to FIG. 18, the control device 140 causes the wheel axle lock 114 to release the lock of the wheel axle 137. While keeping the traveling tower 120 stopped in a state that the rotation shaft 135 is positioned in Y-direction forward side of the wheel axle 137, the feeding device 125 is caused to lower the lifter 121 to a predetermined level. Since the lifter 121 is lowered from a state that the rotation shaft 135 is positioned in Y-direction forward side and above of the wheel axle 137, the wheel 136 rolls toward Y-direction backward side on the traveling surface 112a, the traveling surface 111a, and the traveling surface 113a with the lifter 121 being lowered and then stops on the traveling surface 113a. Consequently, the panel holding portion 130 is turned over in a first turnover direction and the holding side 131a becomes oriented downward.

Figure 19:
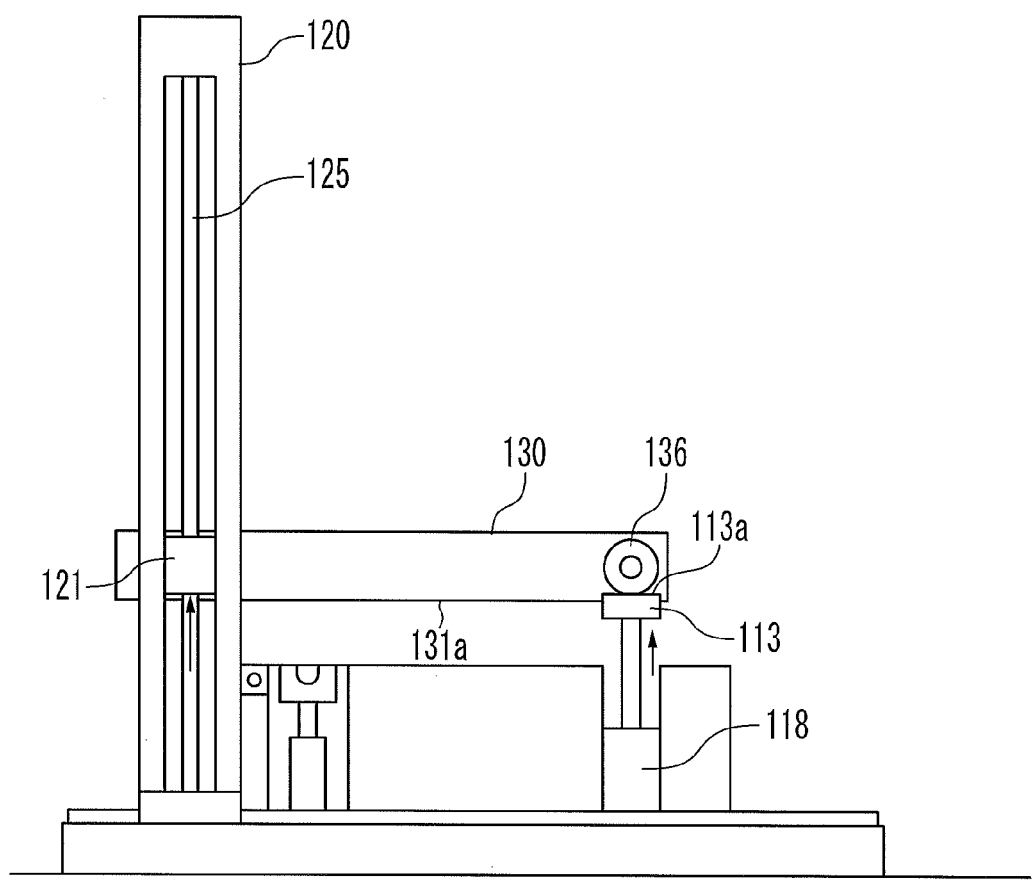
FIG. 19 shows a step of raising the panel holding portion.

Referring to FIG. 19, the control device 140 causes the feeding device 125 and the feeding device 118 to raise the lifter 121 and the wheel axle lifter 113 to predetermined vertical positions at the same time. Consequently, the panel holding portion 130 rises with the holding side 131a being oriented downward. After that, an AGV (Automated Guided Vehicle) 83 moves to the position under the panel holding portion 130.

Figure 20:
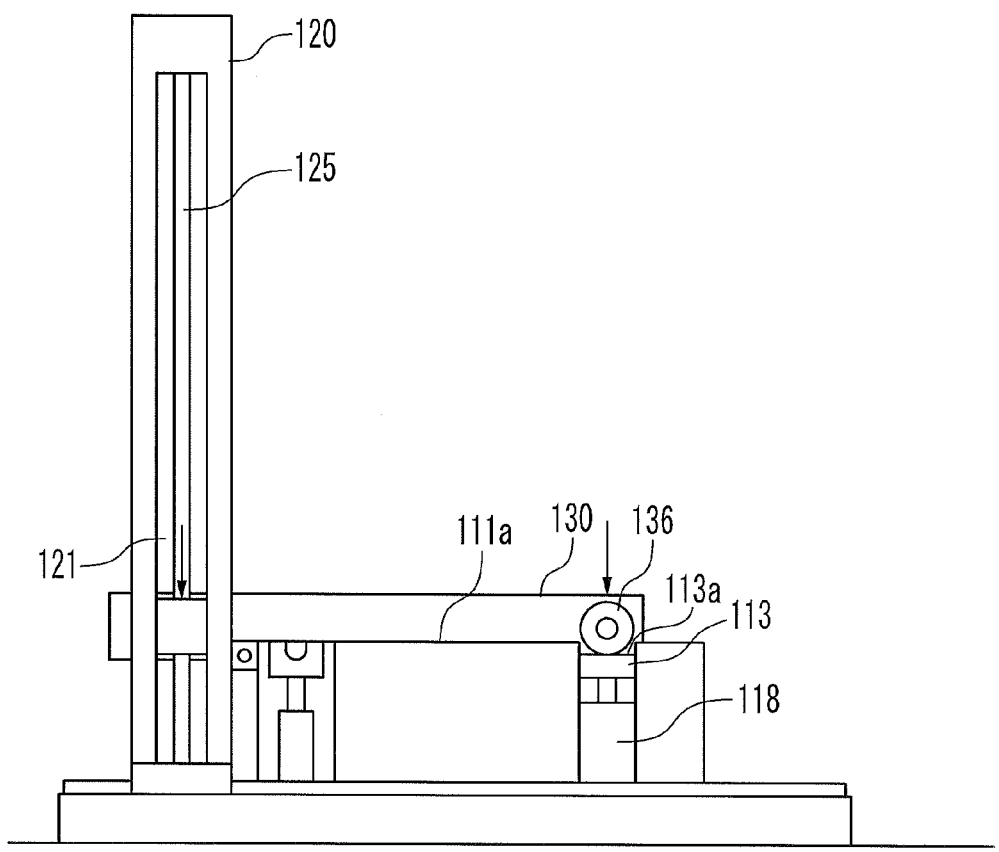
FIG. 20 shows a step of lowering the panel holding portion to transfer the main wing panel to an AGV (Automated Guided Vehicle)

Referring to FIG. 20, the control device 140 causes the feeding device 125 and the feeding device 118 to lower the lifter 121 and the wheel axle lifter 113 to predetermined vertical positions at the same time. Consequently, the panel holding portion 130 falls with the holding side 131a being oriented downward. As a result, the vertical positions of the lifter 121, the wheel axle lifter 113, and the panel holding portion 130 respectively become lower than the vertical positions shown in FIG. 18.

Figure 21:
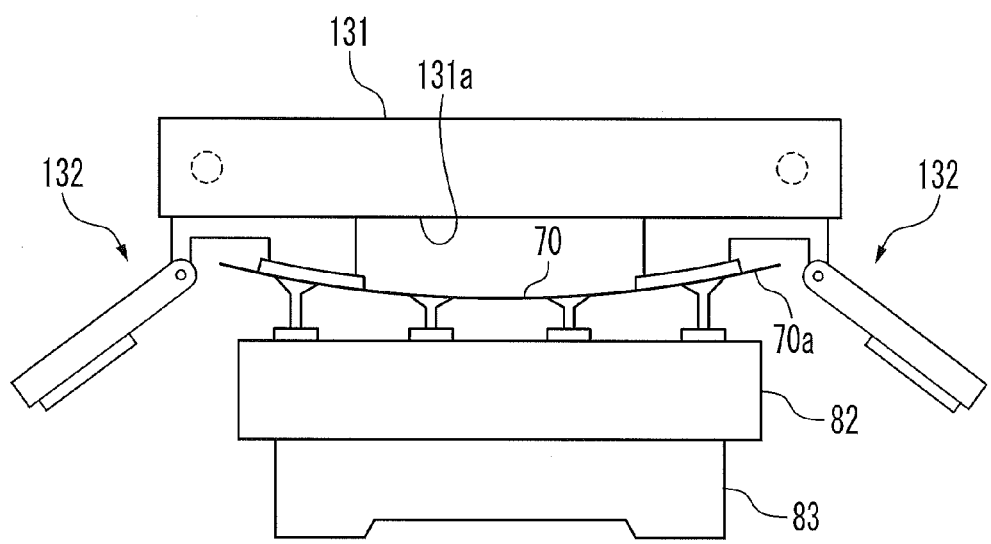
FIG. 21 shows a step of the AGV receiving the main wing panel from the panel holding portion.

Referring to FIG. 21, the AGV 83 includes a jig 82. The control device 140 causes the clamp devices 132 to open when the panel holding portion 130 is in a state of FIG. 20, thus, the main wing panel 70 is transferred from the panel holding portion 130 to the jig 82. The jig 82 supports, from a position under the convex face side 70a, the convex face side 70a which is oriented downward.

Again, the control device 140 causes the feeding device 125 and the feeding device 118 to raise the lifter 121 and the wheel axle lifter 113 to the predetermined vertical positions shown in FIG. 19 at the same time. In this state, the AGV 83 moves from the position under the panel holding portion 130.

Figure 22:
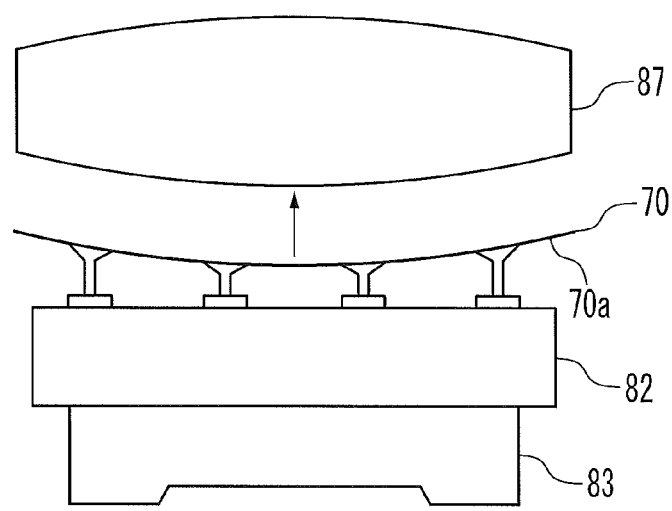
FIG. 22 shows a step of attaching the main wing panel to a lower side of a wing structure.

Referring to FIG. 22, the main wing panel 70 is attached to a lower side of a wing structure 87 in a state that the convex face side 70a is oriented downward.

Figure 23:
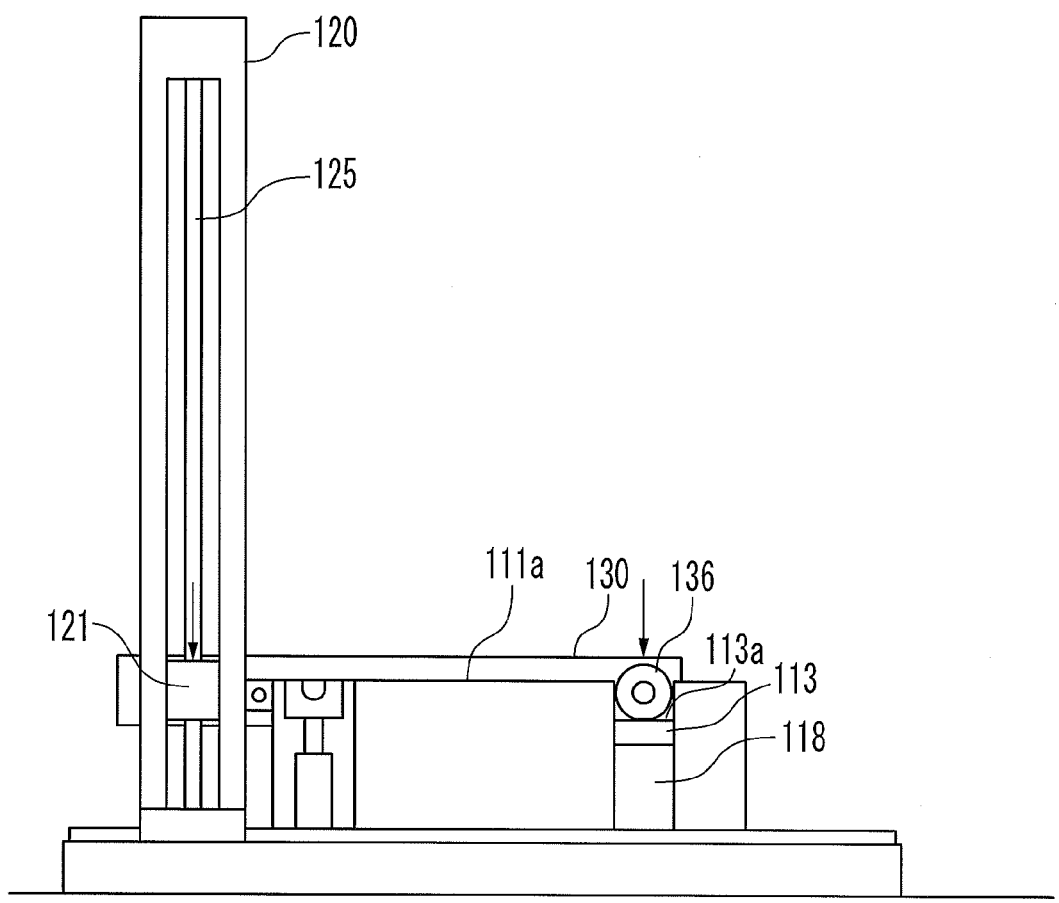
FIG. 23 shows a step of lowering the panel holding portion to exchanging face plates.

Referring to FIG. 23, after the AGV 83 moves from the position under the panel holding portion 130, the control device 140 causes the feeding device 125 and the feeding device 118 to lower the lifter 121 and the wheel axle lifter 113 to predetermined vertical positions at the same time. Consequently, the panel holding portion 130 falls with the holding side 131a being oriented downward. As a result, the vertical positions of the lifter 121, the wheel axle lifter 113, and the panel holding portion 130 respectively become lower than the vertical positions shown in FIG. 20. In this state, the face plates 133a and the face plates 134a are exchanged for others corresponding to an upper side panel.

Next, there is described a turnover method for a case that the main wing panel 70 is the upper side panel. The turnover method for the case that the main wing panel 70 is the upper side panel is same as the case that the main wing panel 70 is the lower side panel in the steps before the turnover apparatus 10 becomes the state shown in FIG. 17.

Figure 24:
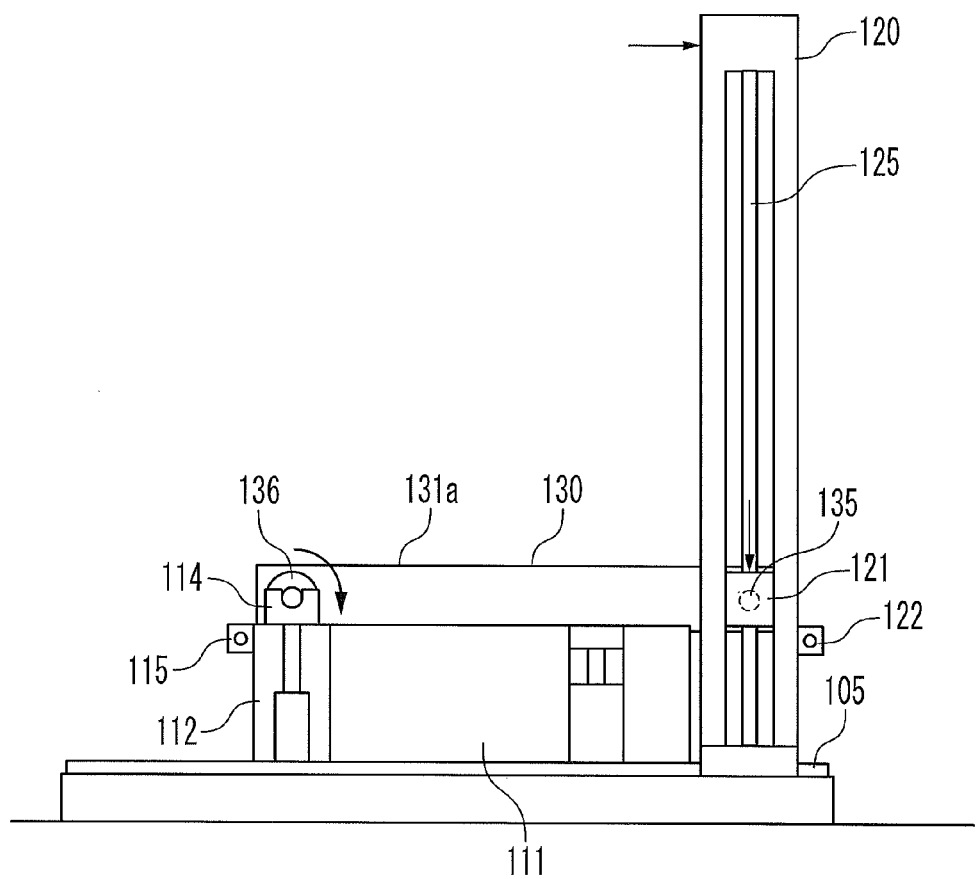
FIG. 24 shows a step of turning over the panel holding portion in a second turnover direction reverse to the first turn over direction.

Referring to FIG. 24, the control device 140 causes the coupler 115 to release the coupling between the tower following portion 112 and the traveling tower 120. While causing the wheel axle lock 114 to lock the wheel axle 137 to fix the position of the wheel axle 137, the control device 140 causes the feeding device 105 to travel toward Y-direction backward side and causes the feeding device 125 to raise and lower the lifter 121 such that the rotation shaft 135 executes a circular motion of which a center is the wheel axle 137. According to such control by the control device 140, the panel holding portion 130 is turned over in a second turnover direction reverse to the first turnover direction and the holding side 131a becomes oriented upward.

Figure 25:
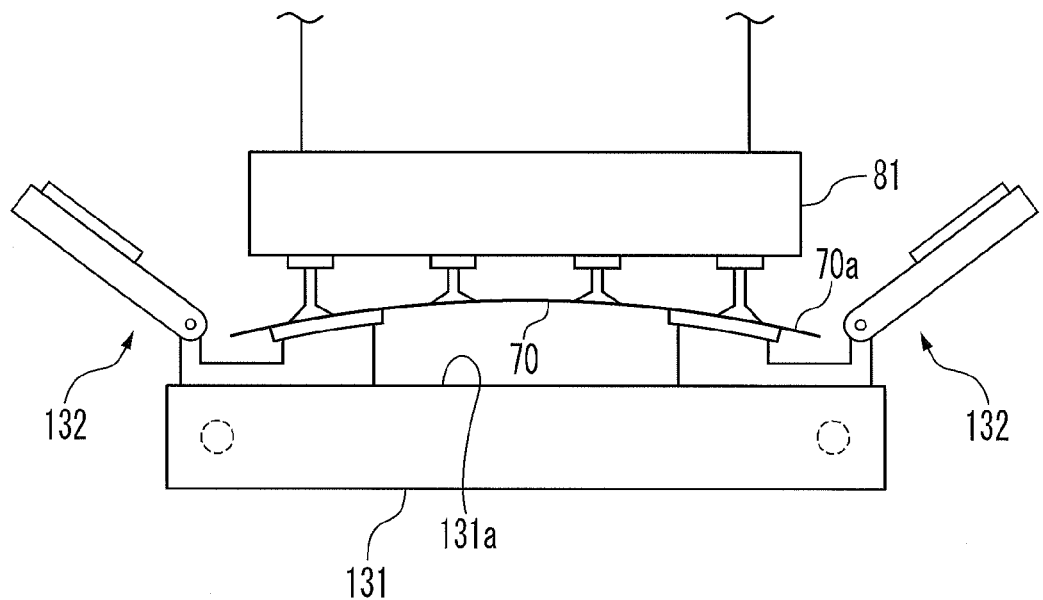
FIG. 25 shows a step of a sling jig receiving a main wing panel from the panel holding portion.

Referring to FIG. 25, a sling jig 81 hung from an overhead type crane (not shown) holds with vacuum the convex face side 70a oriented upward from a position above the convex face side 70a. The control device 140 causes the clamp devices 132 to open, thus, the main wing panel 70 is transferred from the panel holding portion 130 to the sling jig 81.

Figure 26:
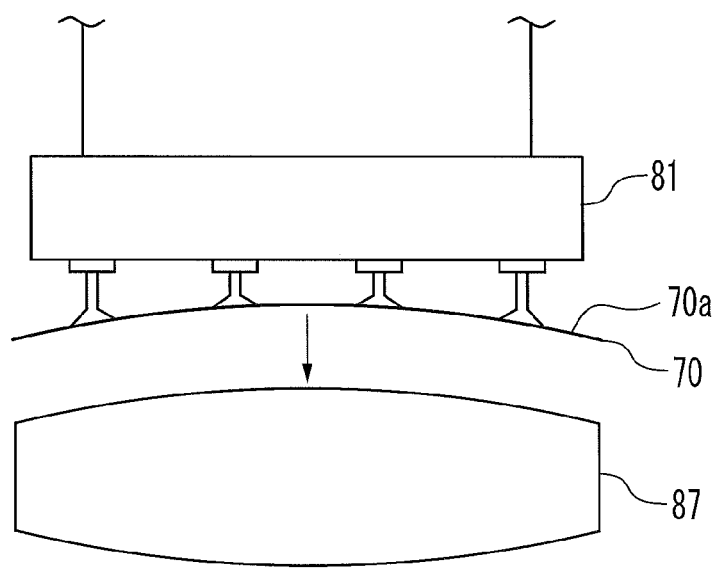
FIG. 26 shows a step of attaching the main wing panel to an upper side of the wing structure.

Referring to FIG. 26, the main wing panel 70 is attached to an upper side of the wing structure 87 in a state that the convex face side 70a is oriented upward.

According to the present embodiment, the main wing panel 70 can be turned over in two directions by using a single apparatus. According to the present embodiment, an operation space to turn over the main wing panel 70 can be saved. According to the present embodiment, since a positioning accuracy is excellent in the transfers shown in FIG. 20 and FIG. 24, the transfers from the panel holding portion 130 to the sling jig 81 and the AGV 83 are easy. According to the present embodiment, almost portions of the turnover operation can be automated.

According to the present embodiment, an operational safety is secured in a turnover of a panel. According to the present embodiment, man-hour for a turnover of a panel can be saved. According to the present embodiment, since a panel is prevented from being damaged, a product quality is securely guaranteed.

The turnover apparatus, the turnover system, and the turnover method according to the present embodiment are especially preferable to turn over a large panel such as a main wing panel of an aircraft, and are also applicable to a turnover of other turnover targets.

The present invention has been described with reference to the embodiments; however, the present invention is not limited to the above embodiments. Various modifications can be applied to the above embodiments.

The invention claimed is:

1. A turnover apparatus comprising:
    a tower configured to travel on a tower traveling base;
    a lifter configured to rise and fall along said tower;
    a target holding portion configured to hold a turnover target;
    a wheel traveling base which includes a tower following portion and a fixed portion, the tower following portion being configured to be able to travel parallel to said tower;
    a coupler which couples said tower following portion to said tower;
    a wheel axle rotatably attached to said target holding portion;
    a wheel attached to the wheel axle and configured to roll on said wheel traveling base;
    a wheel axle lock configured to lock said wheel axle such that said wheel does not roll on said wheel traveling base and said wheel axle can rotate with respect to said target holding portion; and
    a control device,
    wherein said target holding portion is attached to said lifter via a rotation shaft parallel to said wheel axle,
    wherein said control device causes said target holding portion to turn over in a first turnover direction by causing said lifter to fall in a state that said wheel axle lock does not lock said wheel axle and said tower is stopped at a position on a front side of said wheel axle, and
    wherein said control device causes said target holding portion to turn over in a second turnover direction reverse to said first turnover direction by controlling a travel of said tower and rise and fall of said lifter such that said rotation shaft revolves about said wheel axle in a state that said wheel axle is locked by said wheel axle lock and said tower travels toward a back side of said wheel traveling base.

2. The turnover apparatus according to claim 1, wherein said wheel traveling base includes a wheel axle lifter configured to raise and lower said wheel axle.

3. The turnover apparatus according to claim 1, wherein said target holding portion includes:
    a frame; and
    a clamp device attached to said frame,
    said wheel axle is rotatably attached to said frame,
    said frame is attached to said lifter via said rotation shaft, and
    said clamp device clamps said turnover target.

4. The turnover apparatus according to claim 3, wherein said clamp device includes a face plate configured to touch said turnover target, and
    said face plate is exchangeable.

5. The turnover apparatus according to claim 3, wherein said clamp device is attached to said frame such that a position of said clamp device is adjustable.

6. A turnover system comprising:
    a panel edge support device configured to support an edge portion of a panel from a position under the edge portion;
    a panel face support device on which said panel leans; and
    a turnover apparatus,
    wherein said turnover apparatus includes:
        a tower configured to travel on a tower traveling base;
        a lifter configured to rise and fall along said tower;
        a panel holding portion configured to receive said panel from said panel edge support device and said panel face support device and hold said panel;
        a wheel traveling base;
        a wheel axle rotatable attached to said panel holding portion;
        a wheel attached to the wheel axle and configured to roll on said wheel traveling base; and
        a wheel axle lock,
    wherein said panel holding portion is attached to said lifter via a rotation shaft parallel to said wheel axle,
    wherein said wheel axle lock is configured to lock said wheel axle such that said wheel does not roll on said wheel traveling base and said wheel axle can rotate with respect to said panel holding portion, and
    wherein said panel edge support device includes:
        a panel receiving portion configured to support the edge portion of the panel; and
        feeding devices configured to raise and lower said panel receiving portion and to move said panel receiving portion forward and backward in traveling directions of said tower.

7. The turnover system according to claim 6, wherein said panel receiving portion includes:
    a sliding body configured to be raised and lowered and to be moved forward and backward by said feeding devices;
    a block supporting portion configured to rise and fall with respect to said sliding body;
    a panel receiving block attached to said block supporting portion and configured to support the edge portion of the panel; and
    a first spring configured to biases said block supporting portion upward,
    said sliding body includes a stopper, and
    said block supporting portion stops falling with respect to said sliding body when bumping against said stopper.

8. The turnover system according to claim 7, wherein said panel receiving block is attached to said block supporting portion such that said panel receiving block can move forward and backward in traveling directions of said tower, and
    said panel receiving portion includes a second spring configured to receive force of a traveling direction of said tower acting on said panel receiving block.

9. The turnover system according to claim 6, wherein said panel receiving portion includes a notched portion, and
    said panel edge support device includes a detector configured to detect that the edge portion of the panel is positioned at said notched portion.

10. The turnover system according to claim 9, further comprising a protection cover configured to be attached to the edge portion of the panel such that a first portion of the edge portion of the panel is covered by said protection cover and a second portion of the edge portion of the panel is not covered by said protection cover, wherein said detector includes a light emitting portion and a light receiving portion, and wherein said light emitting portion and said light receiving portion are arranged such that said second portion blocks a light path between said light emitting portion and said light receiving portion when said protection cover touches said notched portion.

11. The turnover system according to claim 6, further comprising a protection cover configured to attach to the edge portion, wherein said protection cover touches said panel edge support device.

12. The turnover system according to claim 6, wherein said panel face support device includes:

a plurality of panel support portions which supports said panel; and a plurality of feeding devices configured to respectively move said plurality of panel support portions forward and backward, and said plurality of feeding devices arrange said plurality of panel support portions on a predetermined curved plane.

13. The turnover system according to claim 6, further comprising a positioning tool, wherein said positioning tool includes:

a table;

a slide guide provided to said table;

a sliding base configured to slide along said slide guide;

a laser pointer supported by said sliding base; and a locking portion configured to lock said sliding base to said table selectively at a plurality of predetermined positions.

14. A turnover system comprising:

a panel edge support device configured to support an edge portion of a panel from a position under the edge portion;

a panel face support device on which said panel leans; and a turnover apparatus, wherein said turnover apparatus includes:

a tower configured to travel on a tower traveling base;

a lifter configured to rise and fall along said tower;

a target holding portion configured to hold a turnover target;

a wheel traveling base which includes a tower following portion and a fixed portion, the tower following portion being configured to be able to travel parallel to said tower;

a coupler which couples said tower following portion to said tower;

a wheel axle rotatably attached to said target holding portion;

a wheel attached to the wheel axle and configured to roll on said wheel traveling base;

a wheel axle lock configured to lock said wheel axle such that said wheel does not roll on said wheel traveling base and said wheel axle can rotate with respect to said target holding portion; and a control device, wherein said target holding portion is attached to said lifter via a rotation shaft parallel to said wheel axle, wherein said control device causes said target holding portion to turn over in a first turnover direction by causing said lifter to fall in a state that said wheel axle lock does not lock said wheel axle and said tower is stopped at a position on a front side of said wheel axle, wherein said control device causes said target holding portion to turn over in a second turnover direction reverse to said first turnover direction by controlling a travel of said tower and rise and fall of said lifter such that said rotation shaft revolves about said wheel axle in a state that said wheel axle is locked by said wheel axle lock and said tower travels toward a back side of said wheel traveling base, and wherein said panel edge support device includes:

a panel receiving portion configured to support the edge portion of the panel; and feeding devices configured to raise and lower said panel receiving portion and to move said panel receiving portion forward and backward in traveling directions of said tower.

15. The turnover system according to claim 14, wherein said panel receiving portion includes:

a sliding body configured to be raised and lowered and to be moved forward and backward by said feeding devices;

a block supporting portion configured to rise and fall with respect to said sliding body;

a panel receiving block attached to said block supporting portion and configured to support the edge portion of the panel; and a first spring configured to biases said block supporting portion upward, said sliding body includes a stopper, and said block supporting portion stops falling with respect to said sliding body when bumping against said stopper.

16. The turnover system according to claim 15, wherein said panel receiving block is attached to said block supporting portion such that said panel receiving block can move forward and backward in traveling directions of said tower, and said panel receiving portion includes a second spring configured to receive force of a traveling direction of said tower acting on said panel receiving block.

17. The turnover system according to claim 14, wherein said panel receiving portion includes a notched portion, and said panel edge support device includes a detector configured to detect that the edge portion of the panel is positioned at said notched portion.

18. The turnover system according to claim 17, further comprising a protection cover configured to be attached to the edge portion of the panel such that a first portion of the edge portion of the panel is covered by said protection cover and a second portion of the edge portion of the panel is not covered by said protection cover, wherein said detector includes a light emitting portion and a light receiving portion, and wherein said light emitting portion and said light receiving portion are arranged such that said second portion blocks a light path between said light emitting portion and said light receiving portion when said protection cover touches said notched portion.

19. The turnover system according to claim 14, further comprising a protection cover configured to attach to the edge portion, wherein said protection cover touches said panel edge support device.

20. The turnover system according to claim 14, wherein said panel face support device includes:

a plurality of panel support portions which supports said panel; and a plurality of feeding devices configured to respectively move said plurality of panel support portions forward and backward, and said plurality of feeding devices arrange said plurality of panel support portions on a predetermined curved plane.

* * * * *